(12) United States Patent
Yoshino et al.

(10) Patent No.: US 10,132,386 B2
(45) Date of Patent: Nov. 20, 2018

(54) AUTOMATIC TRANSMISSION FOR VEHICLE

(71) Applicant: TOYOTA JIDOSHA KABUSHIKI KAISHA, Toyota-shi, Aichi-ken (JP)

(72) Inventors: Hirotsugu Yoshino, Susono (JP); Atsushi Honda, Susono (JP); Fusahiro Tsukano, Susono (JP); Naoyuki Kishimoto, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 88 days.

(21) Appl. No.: 15/033,293

(22) PCT Filed: Oct. 29, 2014

(86) PCT No.: PCT/IB2014/002270
§ 371 (c)(1),
(2) Date: Apr. 29, 2016

(87) PCT Pub. No.: WO2015/063575
PCT Pub. Date: May 7, 2015

(65) Prior Publication Data
US 2016/0265628 A1    Sep. 15, 2016

(30) Foreign Application Priority Data

Nov. 1, 2013 (JP) .................................. 2013-228702
Jun. 20, 2014 (JP) .................................. 2014-127071

(51) Int. Cl.
*F16H 3/66* (2006.01)
*F16H 61/04* (2006.01)
*F16H 3/44* (2006.01)

(52) U.S. Cl.
CPC ......... *F16H 3/66* (2013.01); *F16H 2003/445* (2013.01); *F16H 2061/0474* (2013.01);
(Continued)

(58) Field of Classification Search
CPC .............. F16H 3/66; F16H 2200/0078; F16H 2200/2064; F16H 2200/2051;
(Continued)

(56) References Cited

U.S. PATENT DOCUMENTS 8,591,376 B1 * 11/2013 Shim ..................... F16H 3/66
                                                            475/276
9,011,284 B2 * 4/2015 Ziemer ................. B60K 6/365
                                                            180/65.6
(Continued)

FOREIGN PATENT DOCUMENTS

DE    102011080561 A1    2/2013

*Primary Examiner* — Roger L Pang
(74) *Attorney, Agent, or Firm* — Hunton Andrews Kurth LLP

(57) ABSTRACT

An automatic transmission includes a first engagement mechanism selectively engaging a first rotating member to a second rotating member, a second engagement mechanism selectively engaging the first rotating member to a third rotating member, and other engagement mechanisms. At least one of the first or second engagement mechanisms is a dog clutch. The automatic transmission sets intermediate, high and low speed stages by controlling the engagement mechanisms. The first engagement mechanism is kept engaged in shifting from the high speed stage to the intermediate speed stage. The second engagement mechanism is kept engaged in shifting from the low speed stage to the intermediate speed stage. When the automatic transmission sets the intermediate speed stage by controlling the other engagement mechanisms, a rotation speed of the rotating member that is coupled to the first rotating member by the dog clutch coincides with a rotation speed of the first rotating member.

6 Claims, 12 Drawing Sheets

(52) U.S. Cl.
CPC ............... *F16H 2200/0078* (2013.01); *F16H 2200/2012* (2013.01); *F16H 2200/2051* (2013.01); *F16H 2200/2064* (2013.01); *F16H 2200/2094* (2013.01)

(58) Field of Classification Search
CPC ..... F16H 2200/2094; F16H 2003/4456; F16H 2061/0474; F16H 2200/2012; F16H 2003/445
USPC .......................................... 475/275–291, 330
See application file for complete search history.

(56) References Cited

U.S. PATENT DOCUMENTS

| | | | |
|---|---|---|---|
| 9,308,808 B2* | 4/2016 | Griesmeier | B60K 6/365 |
| 2006/0154777 A1 | 7/2006 | Haka et al. | |
| 2012/0283064 A1 | 11/2012 | Herbeth et al. | |
| 2014/0073475 A1* | 3/2014 | Maurer | F16H 3/66 |
| | | | 475/279 |
| 2014/0256499 A1* | 9/2014 | Lippert | F16H 3/46 |
| | | | 475/275 |
| 2015/0167788 A1* | 6/2015 | Beck | F16H 3/66 |
| | | | 475/149 |
| 2016/0040768 A1* | 2/2016 | Beck | F16H 3/64 |
| | | | 475/275 |

* cited by examiner

FIG. 2

|     | C1 | C2 | C3 | B1 | B2 | B3 | D1 | D2 |
|-----|----|----|----|----|----|----|----|----|
| 1st | + |   |   |   | + |   |   | + |
| 2nd |   |   |   |   | + | + |   | + |
| 3rd |   |   |   | + | + |   |   | + |
| 4th |   |   | + |   | + |   |   | + |
| 5th | + |   |   | + |   |   |   | + |
| 6th |   | + |   | + |   |   |   | + |
| 7th | + | + |   |   |   |   | * | * |
| 8th |   | + |   | + |   |   | + |   |
| 9th | + |   |   | + |   |   | + |   |
| 10th |   |   | + |   | + |   | + |   |
| 11th |   |   |   | + | + |   | + |   |
| 12th | + |   |   |   | + |   | + |   |
| Rev |   |   | + |   | + | + |   |   |

FIG. 5

|  | C11 | C12 | C13 | B11 | B12 | B13 | B14 | D11 | D12 |
|---|---|---|---|---|---|---|---|---|---|
| 1st |  |  |  | + |  | + | + |  |  |
| 2nd |  |  | + | + |  |  |  |  | + |
| 3rd |  |  |  | + |  |  | + |  | + |
| 4th |  |  |  | + |  | + |  |  | + |
| 5th |  |  |  |  | + | + |  |  | + |
| 6th |  | + |  | + |  |  |  |  | + |
| 7th |  | + |  |  | + |  |  |  | + |
| 8th | + | + |  |  |  |  |  | * | * |
| 9th |  | + |  |  | + |  |  | + |  |
| 10th |  | + |  | + |  |  |  | + |  |
| 11th |  |  |  |  | + | + |  | + |  |
| 12th |  |  |  | + |  | + |  | + |  |
| Rev |  | + |  | + |  |  | + |  |  |

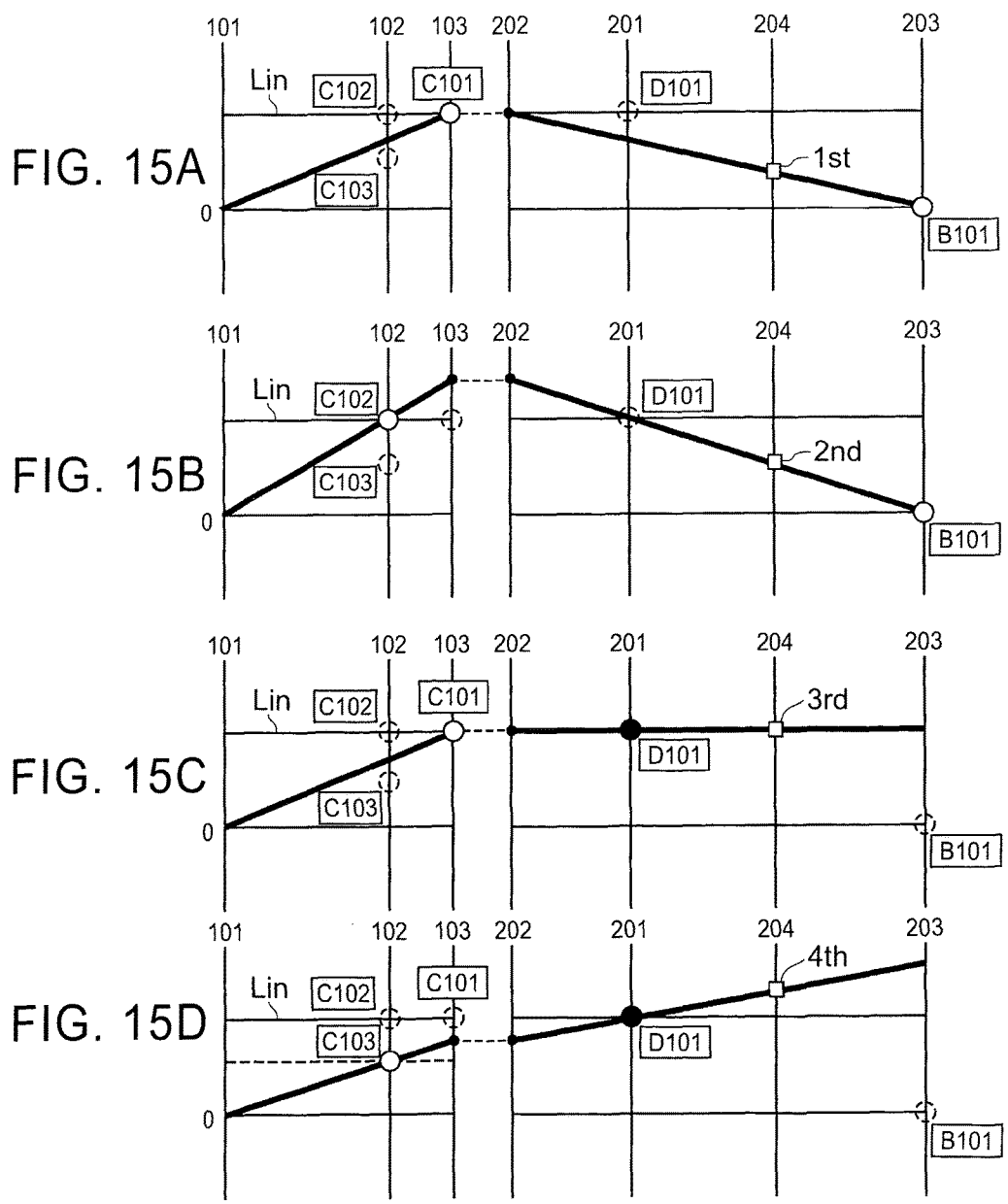

AUTOMATIC TRANSMISSION FOR VEHICLE

CROSS-REFERENCE TO RELATED APPLICATIONS

This is a national phase application based on the PCT International patent application No. PCT/IB 62014/002270 filed Oct. 29, 2014, claiming priority to Japanese Patent Application Nos. 2013-228702 and 2014-127071 filed Nov. 1, 2013 and Jun. 20, 2014, respectively, the entire contents of all of which are incorporated herein by reference.

BACKGROUND OF THE INVENTION

1. Field of the Invention

The invention relates to an automatic transmission that is mounted on a vehicle.

2. Description of Related Art

An invention regarding an automatic transmission is described in US 2012/0283064 A. The automatic transmission described in US 2012/0283064 A includes four planetary gear sets and six engagement mechanisms. The automatic transmission is able to selectively set one of nine forward speed stages and one reverse speed stage. Four of the six engagement mechanisms are friction clutches. The remaining two engagement mechanisms are dog clutches. Each speed stage is set by operating three of those six engagement mechanisms so that the three engagement mechanisms are in an engaged state at the same time. When a shift that accompanies an operation to engage a released one of the dog clutches or an operation to release an engaged one of the dog clutches is carried out, a torque capacity of at least one friction clutch not associated with the shift is increased. Thus, the intended dog clutch is operated in a state where rotation speeds of rotating members that are engaged by the dog clutch are synchronized with each other or in a state where substantially no load is applied between the rotation members.

In the automatic transmission described in US 2012/0283064 A, fixed elements or a coupling relationship among rotating elements of the four planetary gear sets are changed by operating the four friction clutches and the two dog clutches. The nine forward speed stages are allowed to be set by such a change. Because the number of speed stages is large, it is possible to expand the range of gear ratios that are allowed to be set by the transmission. Alternatively, it is possible to reduce a step in gear ratio between the adjacent speed stages.

SUMMARY OF THE INVENTION

In the transmission described in US 2012/0283064 A, there is a concern that the durability of each friction clutch decreases as compared to an existing one. The reason will be described below. In the transmission described in US 2012/0283064 A, at least one friction clutch is engaged when the intended dog clutch is operated as described above. For example, when the dog clutch is engaged, the at least one friction clutch is engaged in order to synchronize the rotation speeds of the rotating members that are engaged by the dog clutch. Alternatively, when the dog clutch is released, the at least one friction clutch is engaged in order not to apply a load between the engaged rotating members. The friction clutch that is engaged in these cases is not associated with setting of the intended speed stage. Thus, in the transmission described in US 2012/0283064 A, in comparison with the case where each of friction clutches is engaged only in order to set a speed stage, a load on friction materials of each of the friction clutches increases. Therefore, there is a concern that the durability of each friction clutch decreases and, by extension, the durability of the transmission decreases.

The invention provides an automatic transmission for a vehicle, which is able to set a large number of speed stages with a simple configuration as much as possible and which has a high durability.

An aspect of the invention provides an automatic transmission for a vehicle. The automatic transmission includes a first rotating member, a second rotating member, a third rotating member, and a plurality of engagement mechanisms. The plurality of engagement mechanisms include a first engagement mechanism, a second engagement mechanism, and other engagement mechanisms other than the first engagement mechanism or the second engagement mechanism. A plurality of speed stages are set by selectively engaging the plurality of engagement mechanisms. The plurality of speed stages include an intermediate speed stage, at least one high speed stage having a lower speed ratio than the intermediate speed stage and at least one low speed stage having a higher speed ratio than the intermediate speed stage. The first engagement mechanism is configured to selectively engage the first rotating member to the second rotating member. The first engagement mechanism is configured to (a) be engaged when the at least one high speed stage is set, (b) be released when the at least one low speed stage is set, (c) be kept in an engaged state at the time of shifting from the at least one high speed stage to the intermediate speed stage, and (d) be kept in a released state at the time of shifting from the at least one low speed stage to the intermediate speed stage. The second engagement mechanism is configured to selectively engage the first rotating member with the third rotating member. The second engagement mechanism is configured to (i) be released when the at least one high speed stage is set, (ii) be engaged when the at least one low speed stage is set, (iii) be kept in a released state at the time of shifting from the at least one high speed stage to the intermediate speed stage, and (iv) be kept in an engaged state at the time of shifting from the at least one low speed stage to the intermediate speed stage. At least one of the first engagement mechanism or the second engagement mechanism is a dog clutch. The automatic transmission is configured such that, when the intermediate speed stage is set, a rotation speed of at least one of the second rotating member or the third rotating member, which is coupled to the first rotating member by the dog clutch, coincides with a rotation speed of the first rotating member.

According to the above aspect, it is possible to set at least three speed stages, that is, the intermediate speed stage that is the predetermined speed stage, the high speed stage on a higher speed side than the intermediate speed stage and the low speed stage on a lower speed side than the intermediate speed stage. At the time of shifting from the low speed stage or the high speed stage to the intermediate speed stage, the intermediate speed stage is allowed to be set by controlling the operations of the other engagement mechanisms other than the first engagement mechanism or the second engagement mechanism while the engaged or released state of each of the first engagement mechanism and the second engagement mechanism is kept. In a state where the intermediate speed stage is set, the rotation speed of the first rotating member coincides with the rotation speed of at least one of the second rotating member or the third rotating member, which is coupled to the first rotating member by the dog clutch. That is, in a state where the intermediate speed stage is set, the rotation speeds of the rotating members that are engaged or released by the dog clutch are synchronized with each other. Thus, it is possible to easily engage the released dog clutch. When the dog clutch is already engaged, it is possible to place the dog clutch in a no-load or substantially no-load state. Thus, it is possible to easily release the engaged dog clutch. Therefore, even when at least one of the first engagement mechanism or the second engagement mechanism is a dog clutch, the first engagement mechanism and the second engagement mechanism each are easily engaged or released by setting the intermediate speed stage. Therefore, by changing the engaged or released state of each of the first engagement mechanism and the second engagement mechanism in a state where the intermediate speed stage is set and controlling the operations of the other engagement mechanisms other than the first engagement mechanism or the second engagement mechanism, it is possible to easily carry out both upshift from the low speed stage to the high speed stage and downshift from the high speed stage to the low speed stage. Thus, it is possible to bring the rotation speeds of the rotating members that are coupled by the dog clutch into coincidence with each other without providing any special device or mechanism. Alternatively, it is possible to bring the rotation speeds of the rotating members that are coupled by the dog clutch into coincidence with each other without executing any exclusive control. Therefore, it is possible to easily change the engaged or released state of each of the first engagement mechanism and the second engagement mechanism, including at least one dog clutch, with a simple configuration. Because the other engagement mechanisms other than the first engagement mechanism or the second engagement mechanism are not engaged only in order to operate the dog clutch, it is possible to prevent an increase in load on those other engagement mechanisms. As a result, it is possible to improve the durability of the vehicle automatic transmission.

By controlling the operations of the other engagement mechanisms and changing the engaged or released state of each of the first engagement mechanism and the second engagement mechanism, it is possible to set the low speed stage on a lower speed side than the intermediate speed stage and the high speed stage on a higher speed side than the intermediate speed stage in addition to the intermediate speed stage. Therefore, it is possible to easily set the plurality of at least three speed stages including the intermediate speed stage in response to the operations of the first engagement mechanism and the second engagement mechanism, including at least one dog clutch.

In the above aspect, the intermediate speed stage may be a speed stage having a speed ratio of "1".

According to the above aspect, it is possible to easily set the plurality of speed stages including a speed-reducing speed stage and a speed-increasing speed stage on both sides of the speed stage having a speed ratio of "1" in response to the operations of the first engagement mechanism and the second engagement mechanism, including at least one dog clutch.

In the above aspect, the first engagement mechanism and the second engagement mechanism may be dog clutches. The automatic transmission may be configured such that, when the intermediate speed stage is set, all the rotation speed of the first rotating member, the rotation speed of the second rotating member and the rotation speed of the third rotating member coincide with one another.

According to the above aspect, it is possible to set the intermediate speed stage by controlling the operations of the other engagement mechanisms other than the first engagement mechanism or the second engagement mechanism while keeping the engaged or released state of each of the first engagement mechanism and the second engagement mechanism that are both dog clutches. In a state where the intermediate speed stage is set, all the rotation speed of the first rotating member, the rotation speed of the second rotating member and the rotation speed of the third rotating member coincide with one another. That is, in a state where the intermediate speed stage is set, all the rotation speeds of the rotating members that are engaged or released by the dog clutches are synchronized with each other. Thus, it is possible to easily engage the released dog clutch. When the dog clutch is already engaged, it is possible to place the dog clutch in a no-load or substantially no-load state. Thus, it is possible to easily release the engaged dog clutch. Therefore, by changing the engaged or released state of each of the first engagement mechanism and the second engagement mechanism in a state where the intermediate speed stage is set and controlling the operations of the other engagement mechanisms other than the first engagement mechanism or the second engagement mechanism, it is possible to easily carry out both upshift from the low speed stage to the high speed stage and downshift from the high speed stage to the low speed stage.

In the above aspect, the automatic transmission may further include an output shaft, and four planetary gear trains arranged between the first rotating member and the output shaft. The first rotating member may be an input shaft.

According to the above aspect, the vehicle automatic transmission according to the invention may include the plurality of engagement mechanisms and the four planetary gear trains. The plurality of engagement mechanisms include the first engagement mechanism and the second engagement mechanism, including the above-described at least one dog clutch, and the other engagement mechanisms other than the first engagement mechanism or the second engagement mechanism.

In the above aspect, the first engagement mechanism and the second engagement mechanism each may be arranged so as to be indicated on a straight line at which rotation speeds of the first rotating member, the second rotating member and the third rotating member are the same in a collinear diagram for the four planetary gear trains.

According to the above aspect, the first engagement mechanism and the second engagement mechanism, including at least one dog clutch, are arranged in the vehicle automatic transmission, including the above-described four planetary gear trains, so as to be indicated on the same predetermined rotation speed line in the collinear diagram for the four planetary gear trains. Thus, in a state where at least one dog clutch that is used as the first engagement mechanism or the second engagement mechanism is in an engaged state, the rotation speed of the two rotating members that are engaged by the dog clutch coincide with each other at the predetermined rotation speed. Therefore, by engaging the other engagement mechanisms other than the first engagement mechanism or the second engagement mechanism to set the intermediate speed stage, it is possible to bring the rotation speeds of the rotating members of the at least one dog clutch that is used as at least one of the first engagement mechanism or the second engagement mechanism into coincidence with each other. As a result, the at least one dog clutch that is used as at least one of the first engagement mechanism or the second engagement mechanism is placed in an easily operable state.

In the above aspect, the four planetary gear trains may be arranged in order of a first planetary gear train, a second planetary gear train, a third planetary gear train and a fourth planetary gear train from a side close to the input shaft. The first planetary gear train may include a first rotating element, a second rotating element and a third rotating element. The second planetary gear train may include a fourth rotating element, a fifth rotating element and a sixth rotating element. The third planetary gear train may include a seventh rotating element, an eighth rotating element and a ninth rotating element. The fourth planetary gear train may include a tenth rotating element, an eleventh rotating element and a twelfth rotating element. The other engagement mechanisms may include a first friction clutch, a second friction clutch, a third friction clutch, a first friction brake, a second friction brake and a third friction brake. The first friction clutch may be configured to selectively couple the first rotating element and the fourth rotating element to the input shaft. The second friction clutch may be configured to selectively couple the second rotating element to the input shaft. The third friction clutch may be configured to selectively couple the third rotating element and the sixth rotating element to the input shaft. The first friction brake may be configured to selectively fix each of the third rotating element and the sixth rotating element in a non-rotatable state. The second friction brake may be configured to selectively fix the second rotating element in a non-rotatable state. The third friction brake may be configured to selectively fix at least one of the rotating elements of the third planetary gear train or the rotating elements of the fourth planetary gear train in a non-rotatable state. The second rotating member may be any one of the seventh rotating element, the eighth rotating element and the ninth rotating element. The third rotating member may be any one of the tenth rotating element, the eleventh rotating element and the twelfth rotating element. The first engagement mechanism and the second engagement mechanism may be dog clutches.

The automatic transmission may be configured to set twelve forward speed stages and one reverse speed stage.

According to the above aspect, the vehicle automatic transmission that is able to set twelve forward speed stages and one reverse speed stage may be formed of the four planetary gear trains and the eight engagement mechanisms including the two dog clutches.

In the above aspect, the four planetary gear trains may be arranged in order of a first planetary gear train, a second planetary gear train, a third planetary gear train and a fourth planetary gear train from a side close to the input shaft. The first planetary gear train may include a first rotating element, a second rotating element and a third rotating element. The second planetary gear train may include a fourth rotating element, a fifth rotating element and a sixth rotating element. The third planetary gear train may include a seventh rotating element, an eighth rotating element and a ninth rotating element. The fourth planetary gear train may include a tenth rotating element, an eleventh rotating element and a twelfth rotating element. The other engagement mechanisms may include a first friction clutch, a second friction clutch, a third friction clutch, a first friction brake, a second friction brake, a third friction brake and a fourth friction brake. The first friction clutch may be configured to selectively couple the fourth rotating element to the input shaft. The second friction clutch may be configured to selectively couple the sixth rotating element to the input shaft. The third friction clutch may be configured to selectively couple the third rotating element to any two of the rotating elements of the second planetary gear train. The first friction brake may be configured to selectively fix the second rotating element in a non-rotatable state. The second friction brake may be configured to selectively fix the third rotating element in a non-rotatable state. The third friction brake may be configured to selectively fix the sixth rotating element in a non-rotatable state. The fourth friction brake may be configured to selectively fix at least one of the rotating elements of the third planetary gear train or the rotating elements of the fourth planetary gear train in a non-rotatable state. The second rotating member may be any one of the seventh rotating element, the eighth rotating element and the ninth rotating element. The third rotating member may be any one of the tenth rotating element, the eleventh rotating element and the twelfth rotating element. The first engagement mechanism and the second engagement mechanism may be dog clutches.

The automatic transmission may be configured to set twelve forward speed stages and one reverse speed stage.

According to the above aspect, the vehicle automatic transmission that is able to set twelve forward speed stages and one reverse speed stage may be formed of the four planetary gear trains and the nine engagement mechanisms including the two dog clutches.

In the above aspect, the automatic transmission may further include an output shaft, a front transmission unit, and a rear transmission unit. The first rotating member may be an input shaft. The front transmission unit may be configured such that, when at least any two of the other engagement mechanisms are engaged, rotating elements that constitute the front transmission unit integrally rotate at the same rotation speed as the first rotating member. The rear transmission unit may include a plurality of planetary gear trains. The rear transmission unit may include a first element, a second element, a third element and a fourth element that differentially rotate with one another by coupling predetermined rotating elements to each other in the plurality of planetary gear trains. The second rotating member may be the first element. The first engagement mechanism may be provided between the first element and the input shaft. The third rotating member may be the second element. The second engagement mechanism may be provided between the second element and the input shaft. The third element may be coupled to any one of the rotating elements that constitute the front transmission unit. The fourth element may be coupled to the output shaft.

According to the above aspect, the vehicle automatic transmission is formed of the output shaft, the front transmission unit, and the rear transmission unit. The front transmission unit is configured such that the whole of the front transmission unit integrally rotates at the same rotation speed as the input shaft by engaging the predetermined two engagement mechanisms other than the first engagement mechanism or the second engagement mechanism. The rear transmission unit is configured such that the first element is coupled to the input shaft by engaging the first engagement mechanism and the second element is coupled to the input shaft by engaging the second engagement mechanism. Therefore, by setting the front transmission unit to a state where the front transmission unit rotates at the same rotation speed as the input shaft and engaging the first engagement mechanism or the second engagement mechanism, the whole of each of the front transmission unit and the rear transmission unit rotates at the same rotation speed as the input shaft. That is, the input shaft and the output shaft rotate at the same rotation speed, and a so-called direct-coupling speed stage having a speed ratio of 1 is set. Thus, it is possible to set the direct-coupling speed stage by controlling the operations of the other engagement mechanisms other than the first engagement mechanism or the second engagement mechanism in a state where one of the first engagement mechanism and the second engagement mechanism is engaged. It is possible to set the high speed stage by controlling the operations of the other engagement mechanisms in a state where the direct-coupling speed stage is set by engaging the first engagement mechanism and releasing the second engagement mechanism. It is possible to set the low speed stage by controlling the operations of the other engagement mechanisms in a state where the direct-coupling speed stage is set by engaging the second engagement mechanism and releasing the first engagement mechanism. That is, the direct-coupling speed stage in this case is the intermediate speed stage according to the invention, and the intermediate speed stage may be set by controlling the operations of the other engagement mechanisms other than the first engagement mechanism or the second engagement mechanism in a state where one of the first engagement mechanism and the second engagement mechanism is engaged. In a state where the intermediate speed stage, that is, the direct-coupling speed stage, is set, even when at least one of the first engagement mechanism or the second engagement mechanism is a dog clutch, it is possible to easily change the engaged or released state of each of the first engagement mechanism and the second engagement mechanism. For example, it is possible to change from a state where the first engagement mechanism is engaged and the second engagement mechanism is released to a state where both the first engagement mechanism and the second engagement mechanism are engaged by easily engaging the second engagement mechanism. It is possible to change from this state to a state where the first engagement mechanism is released and the second engagement mechanism is engaged by easily releasing the first engagement mechanism. Similarly, it is possible to change from a state where the first engagement mechanism is released and the second engagement mechanism is engaged to a state where both the first engagement mechanism and the second engagement mechanism are engaged by easily engaging the first engagement mechanism. It is possible to change from this state to a state where the first engagement mechanism is engaged and the second engagement mechanism is released by easily releasing the second engagement mechanism. In this way, by once changing from a state where one of the first engagement mechanism and the second engagement mechanism is engaged to a state where both the first engagement mechanism and the second engagement mechanism are engaged, it is possible to easily change the engaged or released state of each of the first engagement mechanism and the second engagement mechanism. That is, it is possible to easily exchange transmitted torque between the first engagement mechanism and the second engagement mechanism. Therefore, it is possible to appropriately set at least three speed stages, that is, the low speed stage, the intermediate speed stage and the high speed stage, so it is possible to appropriately carry out a shift therebetween.

In the above aspect, the first element, the second element, the third element and the fourth element of the rear transmission unit may be represented by four line segments arranged parallel to one another at intervals based on a gear ratio among the plurality of planetary gear trains in a collinear diagram. Rotation speeds of the first element, the second element, the third element and the fourth element of the rear transmission unit each may be indicated by a distance from a base line that intersects with the four line segments in the collinear diagram. In the collinear diagram, the at least one high speed stage may be represented by a straight line that is determined by two points that are a point indicating the rotation speed of the third element and a point indicating the rotation speed of the engaged first engagement mechanism. In the collinear diagram, the at least one low speed stage may be represented by a straight line that is determined by two points that are the point indicating the rotation speed of the third element and a point indicating the rotation speed of the engaged second engagement mechanism. In the collinear diagram, the intermediate speed stage may be represented by a straight line that is determined by two points that are the point indicating the rotation speed of the engaged first engagement mechanism and the point indicating the rotation speed of the engaged second engagement mechanism.

According to the above aspect, the rotation speed of the third element of the rear transmission unit coupled to the front transmission unit is set in multiple steps by controlling the operations of the other engagement mechanisms other than the first engagement mechanism or the second engagement mechanism in a state where the first engagement mechanism is engaged. Thus, it is possible to set a plurality of high speed stages. The rotation speed of the third element of the rear transmission unit coupled to the front transmission unit is set in multiple steps by controlling the operations of the other engagement mechanisms other than the first engagement mechanism or the second engagement mechanism in a state where the second engagement mechanism is engaged. Thus, it is possible to set a plurality of low speed stages. It is possible to easily carry out such a shift between the high speed stage and the low speed stage via the intermediate speed stage. In a state where the intermediate speed stage is set, it is possible to easily exchange transmitted torque between the first engagement mechanism and the second engagement mechanism as described above. Therefore, it is possible to appropriately carry out a shift between the high speed stage and the low speed stage, so it is possible to appropriately set a plurality of speed stages.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a table that shows engaged and released states of engagement mechanisms corresponding to each speed stage that is set by the vehicle automatic transmission shown in FIG. 1;

FIG. 5 is a table that shows engaged and released states of engagement mechanisms corresponding to each speed stage that is set by the vehicle automatic transmission shown in FIG. 4;

FIG. 15A to FIG. 15D are collinear diagrams for illustrating another configuration example and operation principle of the vehicle automatic transmission according to the invention.

DETAILED DESCRIPTION OF EMBODIMENTS

Figure 1:
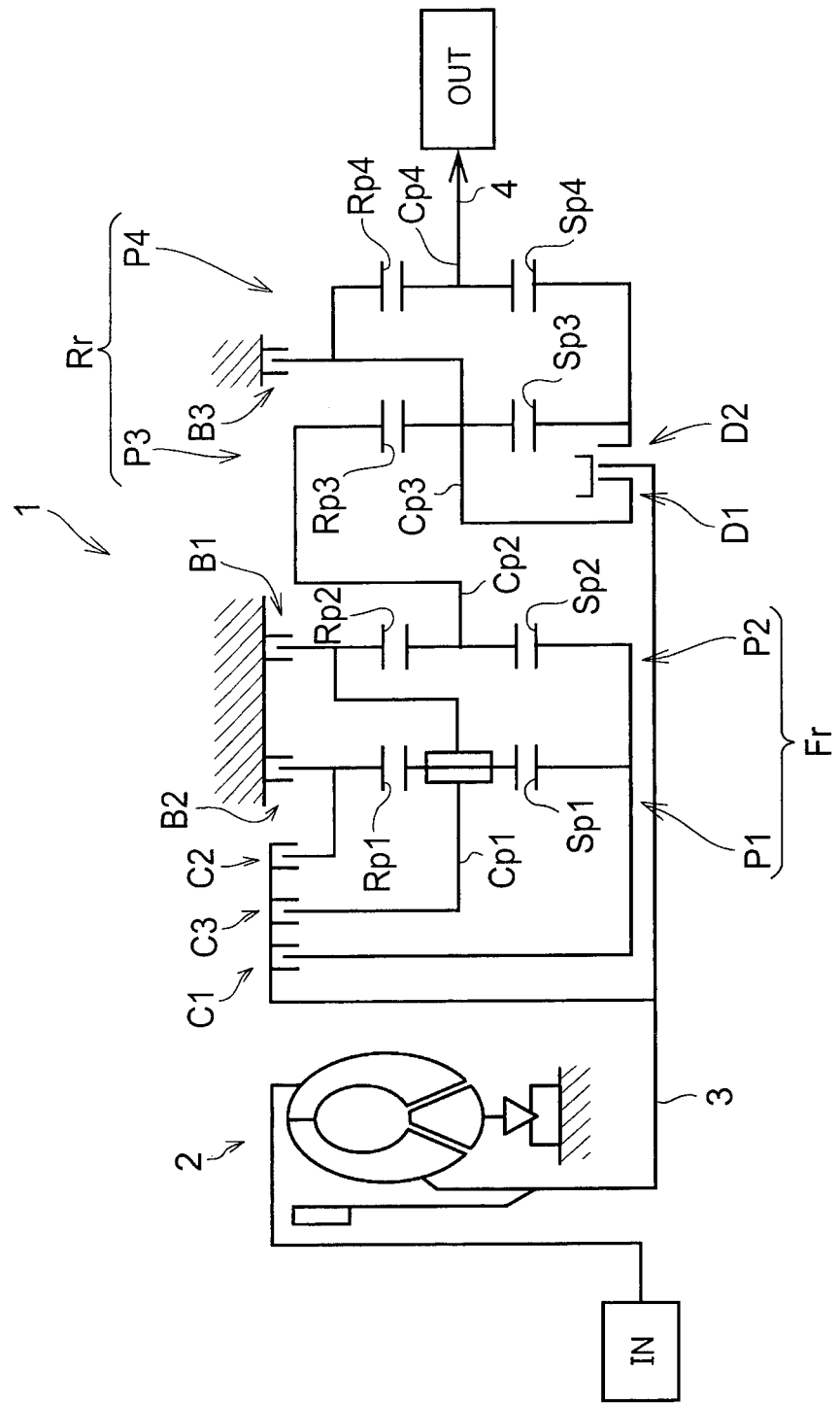
FIG. 1 is a skeletal view for illustrating an example of a gear train of a vehicle automatic transmission according to the invention.

The invention will be described with reference to the accompanying drawings. FIG. 1 shows an example of a gear train of a vehicle automatic transmission to which the invention is applied. The automatic transmission 1 shown in FIG. 1 includes four planetary gear trains and eight engagement mechanisms, and is configured to be able to set twelve forward speed stages and one reverse speed stage.

In FIG. 1, the automatic transmission 1 is provided between a driving force source (not shown) of a vehicle and a drive wheel (not shown). Power output from the driving force source is input to an input shaft 3 via a torque converter 2. The four planetary gear trains, that is, a first planetary gear train P1, a second planetary gear train P2, a third planetary gear train P3 and a fourth planetary gear train P4, are arranged in the stated order from a side close to the input shaft 3 (from the left side in FIG. 1). Those first planetary gear train P1, second planetary gear train P2, third planetary gear train P3 and fourth planetary gear train P4 are arranged in series along the same axis as the input shaft 3. In the example shown in FIG. 1, the above-described first planetary gear train P1, second planetary gear train P2, third planetary gear train P3 and fourth planetary gear train P4 are examples of "four planetary gear trains" according to the invention.

In the automatic transmission 1, it is possible to omit the torque converter 2 or reduce the size of the torque converter 2. The reason is that, as described above, the automatic transmission 1 is able to set a large number of forward speed stages, that is, twelve forward speed stages. Therefore, in comparison with an existing five-speed or six-speed automatic transmission, it is possible to expand the range of a settable speed ratio toward a low-speed-side speed stage, that is, a speed stage having a high speed ratio. Thus, it is possible to set a speed stage having a further large torque amplification function as compared to the existing one. Because such a large speed-reducing speed stage is allowed to be set, torque amplification function of the torque converter 2 becomes unnecessary. Alternatively, the torque amplification function of the torque converter 2 may be reduced. As a result, it is possible to omit the torque converter 2 or reduce the size of the torque converter 2.

The first planetary gear train P1 is a double-pinion-type planetary gear train. Specifically, the first planetary gear train P1 includes a first sun gear Sp1, a first ring gear Rp1 and a first carrier Cp1. The first ring gear Rp1 is arranged concentrically with the first sun gear Sp1. The first carrier Cp1 holds pairs of two pinion gears (not shown) such that the pairs of two pinion gears are rotatable and revolvable. Each pair of two pinion gears are in mesh with these first sun gear Sp1 and first ring gear Rp1.

The second planetary gear train P2 is a single-pinion-type planetary gear train. Specifically, the second planetary gear train P2 includes a second sun gear Sp2, a second ring gear Rp2 and a second carrier Cp2. The second ring gear rp2 is arranged concentrically with the second sun gear Sp2. The second carrier Cp2 holds pinion gears (not shown) such that the pinion gears are rotatable and revolvable. Each pinion gear is in mesh with these second sun gear Sp2 and second ring gear Rp2.

The third planetary gear train P3 is a single-pinion-type planetary gear train. Specifically, the third planetary gear train P3 includes a third sun gear Sp3, a third ring gear Rp3 and a third carrier Cp3. The third ring gear Rp3 is arranged concentrically with the third sun gear Sp3. The third carrier Cp3 holds pinion gears (not shown) such that the pinion gears are rotatable and revolvable. Each pinion gear is in mesh with these third sun gear Sp3 and third ring gear Rp3.

The fourth planetary gear train P4 is a single-pinion-type planetary gear train. Specifically, the fourth planetary gear train P4 includes a fourth sun gear Sp4, a fourth ring gear Rp4 and a fourth carrier Cp4. The fourth ring gear Rp4 is arranged concentrically with the fourth sun gear Sp4. The fourth carrier Cp4 holds pinion gears (not shown) such that the pinion gears are rotatable and revolvable. Each pinion gear is in mesh with these fourth sun gear Sp4 and fourth ring gear Rp4.

Adjacent two of the above-described planetary gear trains P1, P2, P3, P4 are coupled to each other. That is, the first sun gear Sp1 of the first planetary gear train P1 is coupled to the second sun gear Sp2 of the second planetary gear train P2. The first carrier Cp1 of the first planetary gear train P1 is coupled to the second ring gear Rp2 of the second planetary gear train P2. The second carrier Cp2 of the second planetary gear train P2 is coupled to the third ring gear Rp3 of the third planetary gear train P3. The third carrier Cp3 of the third planetary gear train P3 is coupled to the fourth ring gear Rp4 of the fourth planetary gear train P4. The third sun gear Sp3 of the third planetary gear train P3 is coupled to the fourth sun gear Sp4 of the fourth planetary gear train P4. The fourth carrier Cp4 of the fourth planetary gear train P4 is coupled to an output shaft 4. The output shaft 4 is coupled to the drive wheel via, for example, a propeller shaft (not shown), a differential gear (not shown), a drive shaft (not shown), and the like.

In the example shown in FIG. 1, among the above-described four planetary gear trains P1, P2, P3, P4, the first planetary gear train P1 is an example of a first planetary gear train according to the invention, the first sun gear Sp1, first ring gear Rp1 and first carrier Cp1 of the first planetary gear train P1 are respectively examples of a first rotating element, a second rotating element and a third rotating element according to the invention. The second planetary gear train P2 is an example of a second planetary gear train according to the invention. The second sun gear Sp2, second carrier Cp2 and second ring gear Rp2 of the second planetary gear train P2 are respectively examples of a fourth rotating element, a fifth rotating element and a sixth rotating element according to the invention. The third planetary gear train P3 is an example of a third planetary gear train according to the invention. The third sun gear Sp3, third carrier Cp3 and third ring gear Rp3 of the third planetary gear train P3 are respectively examples of a seventh rotating element, an eighth rotating element and a ninth rotating element according to the invention. The fourth planetary gear train P4 is an example of a fourth planetary gear train according to the invention. The fourth sun gear Sp4, fourth carrier Cp4 and fourth ring gear Rp4 of the fourth planetary gear train P4 are respectively examples of a tenth rotating element, an eleventh rotating element and a twelfth rotating element according to the invention.

A clutch C1 is provided between the input shaft 3 and the first planetary gear train P1. The clutch C1 selectively couples the input shaft 3 to the first sun gear Sp1 of the first planetary gear train P1. The clutch C1 is a friction clutch that engages rotating members with each other by friction force. The rotating elements rotate relative to each other.

A clutch C2 is provided between the input shaft 3 and the first planetary gear train P1. The clutch C2 selectively couples the input shaft 3 to the first ring gear Rp1 of the first planetary gear train P1. The clutch C2, as well as the above-described clutch C1, is a friction clutch that engages rotating members with each other by friction force. The rotating elements rotate relative to each other.

A clutch C3 is provided between the input shaft 3 and the first planetary gear train P1. The clutch C3 selectively couples the input shaft 3 to the first carrier Cp1 of the first planetary gear train P1 and the second ring gear Rp2 of the second planetary gear train P2. The clutch C3, as well as the above-described clutches C1, C2, is a friction clutch that engages rotating members with each other by friction force. The rotating elements rotate relative to each other.

A brake B1 is provided in the first carrier Cp1 of the first planetary gear train P1 and the second ring gear Rp2 of the second planetary gear train P2. The brake B1 selectively stops rotation of those first carrier Cp1 and second ring gear Rp2. The brake B1 is a friction brake that engages a rotating member with a fixed member by friction force.

A brake B2 is provided in the first ring gear Rp1 of the first planetary gear train P1. The brake B2 selectively stops rotation of the first ring gear Rp1. The brake B2, as well as the above-described brake B1, is a friction brake that engages a rotating member with a fixed member by friction force.

A brake B3 is provided in the third carrier Cp3 of the third planetary gear train P3 and the fourth ring gear Rp4 of the fourth planetary gear train P4. The brake B3 selectively stops rotation of those third carrier Cp3 and fourth ring gear Rp4. The brake B3, as well as the above-described brakes B1, B2, is a friction brake that engages a rotating member with a fixed member by friction force.

A clutch D1 is provided between the input shaft 3 and the third planetary gear train P3. The clutch D1 selectively couples the input shaft 3 to the third carrier Cp3 of the third planetary gear train P3. The clutch D1 is arranged on the input shaft 3 or on a rotary shaft connected to the input shaft 3. The clutch D1 is a dog clutch that meshes and mechanically engages rotating members with each other. The rotating members rotate relative to each other.

A clutch D2 is provided between the input shaft 3 and the third planetary gear train P3. The clutch D2 selectively couples the input shaft 3 to the third sun gear Sp3 of the third planetary gear train P3. The clutch D2 together with the above-described clutch D1 is arranged on the input shaft 3 or on a rotary shaft connected to the input shaft 3. The clutch D2, as well as the above-described clutch D1, is a dog clutch that meshes and mechanically engages rotating members with each other. The rotating members rotate relative to each other.

In the example shown in FIG. 1, the above-described input shaft 3 is an example of a "first rotating member" according to the invention. The third carrier Cp3 is an example of a "second rotating member" according to the invention. In addition, the third carrier Cp3 is an example of a "first element" of a rear transmission unit Rr (described later) according to the invention. Thus, the clutch D1 is an example of a "first dog clutch" according to the invention. The above-described third sun gear Sp3 is an example of a "third rotating member" according to the invention. In addition, the third sun gear Sp3 is an example of a "second element" of the rear transmission unit Rr (described later). Thus, the clutch D2 is an example of a "second dog clutch" according to the invention. As described above, the eight engagement mechanisms, that is, the clutches C1, C2, C3 that are the friction clutches, the brakes B1, B2, B3 that are the friction brakes and the clutches D1, D2 that are the dog clutches, are examples of "a plurality of engagement mechanisms" according to the invention.

Among the above-described "plurality of engagement mechanisms", the clutches C1, C2, C3 and the brakes B1, B2, B3 are examples of "other engagement mechanisms" according to the invention. Particularly, the clutch C1 is a friction clutch that selectively couples both the first sun gear Sp1 (first rotating element) and the second sun gear Sp2 (fourth rotating element) to the input shaft 3, and is an example of a "first friction clutch" according to the invention. The clutch C2 is a friction clutch that selectively couples the first ring gear Rp1 (second rotating element) to the input shaft 3, and is an example of a "second friction clutch" according to the invention. The clutch C3 is a friction clutch that selectively couples both the first carrier Cp1 (third rotating element) and the second ring gear Rp2 (sixth rotating element) to the input shaft 3, and is an example of a "third friction clutch" according to the invention. The brake B1 is a friction clutch that selectively fixes both the first carrier Cp1 (third rotating element) and the second ring gear Rp2 (sixth rotating element) in a non-rotatable state, and is an example of a "first friction brake" according to the invention. The brake B2 is a friction brake that selectively fixes the first ring gear Rp1 (second rotating element) in a non-rotatable state, and is an example of a "second friction brake" according to the invention. The brake B3 is a friction brake that selectively fixes both the third carrier Cp3 (eighth rotating element) and the fourth ring gear Rp4 (twelfth rotating element) in a non-rotatable state. That is, the brake B3 is a friction brake that selectively fixes at least one of the rotating elements of the third planetary gear train P3 or the rotating elements of the fourth planetary gear train P4 in a non-rotatable state. Thus, the brake B3 is an example of a "third friction brake" according to the invention.

Figure 3:
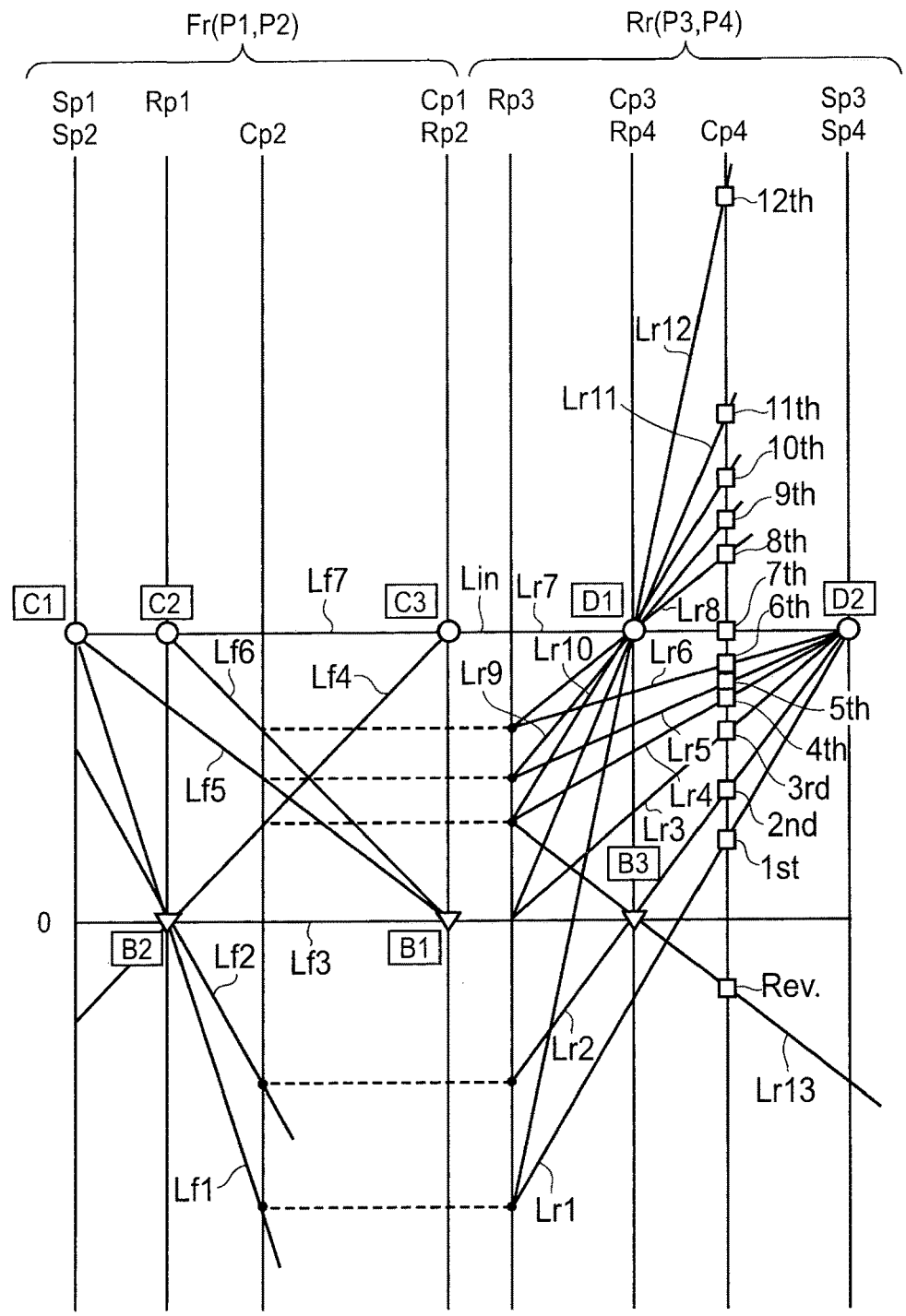
FIG. 3 is a collinear diagram that shows states of rotating elements in each of planetary gear trains that are used in the vehicle automatic transmission shown in FIG. 1.

The thus configured automatic transmission 1 is able to set twelve forward speed stages and one reverse speed stage by operating the engagement mechanisms, that is, the clutches C1, C2, C3, the brakes B1, B2, B3 and the clutches D1, D2. The table of FIG. 2 shows engaged and released states of the engagement mechanisms corresponding to each speed stage. In FIG. 2, "+" indicates an engaged state, and the blank indicates a released state. "*" indicates that one of the clutch D1 and the clutch D2 is in an engaged state or both the clutch D1 and the clutch D2 are in an engaged state. The collinear diagram of FIG. 3 shows states of the planetary gear trains P1, P2, P3, P4 in a state where each speed stage is set. In FIG. 3, the left-side four vertical lines (line segments) respectively represent the rotating elements (the first sun gear Sp1, the first ring gear Rp1, the first carrier Cp1, the second sun gear Sp2, the second ring gear Rp2, and the second carrier Cp2) in a front transmission unit Fr including the first planetary gear train P1 and the second planetary gear train P2. These left-side four vertical lines are arranged parallel to one another at intervals based on a gear ratio among the rotating elements in the first planetary gear train P1 and the second planetary gear train P2. On the other hand, the right-side four vertical lines (line segments) represent the rotating elements (the third sun gear Sp3, the third ring gear Rp3, the third carrier Cp3, the fourth sun gear Sp4, the fourth ring gear Rp4, and the fourth carrier Cp4) in the rear transmission unit Rr including the third planetary gear train P3 and the fourth planetary gear train P4. These right-side four vertical lines are also arranged parallel to one another at intervals based on a gear ratio among the rotating elements in the third planetary gear train P3 and the fourth planetary gear train P4. A horizontal line intersecting at right angles with the above-described left-side four vertical lines and right-side four vertical lines and indicated by "0" is a base line at which the rotation speed is "0". A point that indicates a distance from the base line along each of the above-described vertical lines represents the rotation speed of a corresponding one of the rotating elements. A straight line Lin is a horizontal line that indicates the rotation speed of the input shaft 3.

As shown in FIG. 2, the first speed (1st) is set by engaging the clutch C1, the brake B2 and the clutch D2 and releasing the clutch C2, the clutch C3, the brake B1, the brake B3 and the clutch D1. The state of the first speed is indicated by a straight line Lf1 of the front transmission unit Fr and a straight line Lr1 of the rear transmission unit Rr in the collinear diagram of FIG. 3. Specifically, torque is input from the input shaft 3 to the first sun gear Sp1 and second sun gear Sp2 of the front transmission unit Fr via the clutch C1. Torque is input from the input shaft 3 to the third sun gear Sp3 and fourth sun gear Sp4 of the rear transmission unit Rr via the clutch D2. Torque input to the first sun gear Sp1 and the second sun gear Sp2 is output from the second carrier Cp2 because the brake B2 is engaged. The second carrier Cp2 rotates in a direction opposite to the rotation direction of the input shaft 3. Torque output from the second carrier Cp2 is transmitted to the third ring gear Rp3 of the rear transmission unit Rr.

On the other hand, torque input to the third sun gear Sp3 and the fourth sun gear Sp4 is significantly reduced in rotation speed and is output from the fourth carrier Cp4 because the third ring gear Rp3 rotates together with the second carrier Cp2 in a direction opposite to the rotation direction of the input shaft 3. Torque is then transmitted to the output shaft 4. Thus, torque obtained by significantly reducing the rotation speed of the driving force source is transmitted to the output shaft 4. That is, the first speed having the maximum speed ratio is set.

The second speed (2nd) is set by engaging the brake B2, the brake B3 and the clutch D2 and releasing the clutch C1, the clutch C2, the clutch C3, the brake B1 and the clutch D1. The state of the second speed is indicated by a straight line Lf2 of the front transmission unit Fr and a straight line Lr2 of the rear transmission unit Rr in the collinear diagram of FIG. 3. Specifically, torque is input from the input shaft 3 to the third sun gear Sp3 and fourth sun gear Sp4 of the rear transmission unit Rr via the clutch D2. Torque input to the third sun gear Sp3 and the fourth sun gear Sp4 are reduced in rotation speed and output from the fourth carrier Cp4 because the brake B3 is engaged. Torque is then transmitted to the output shaft 4. The rotation speed of the fourth carrier Cp4 in this case is higher than the rotation speed of the fourth carrier Cp4 in the above-described first speed. Thus, torque obtained by reducing the rotation speed of the driving force source is transmitted to the output shaft 4, and the second speed having a lower speed ratio than the first speed is set.

The third speed (3rd) is set by engaging the brake B1, the brake B2 and the clutch D2 and releasing the clutch C1, the clutch C2, the clutch C3, the brake B3 and the clutch D1. The state of the third speed is indicated by a straight line Lf3 of the front transmission unit Fr and a straight line Lf3 of the rear transmission unit Rr in the collinear diagram of FIG. 3. Specifically, because both the brake B1 and the brake B2 are engaged, all the rotation speeds of the rotating elements of the front transmission unit Fr are "0". Accordingly, the rotation speed of the third ring gear Rp3 of the rear transmission unit Rr that is coupled to the second carrier Cp2 of the front transmission unit Fr is also "0".

On the other hand, torque is input from the input shaft 3 to the third sun gear Sp3 and fourth sun gear Sp4 of the rear transmission unit Rr via the clutch D2. Torque input to the third sun gear Sp3 and the fourth sun gear Sp4 is reduced in rotation speed and output from the fourth carrier Cp4 because the rotation speed of the third ring gear Rp3 is fixed to "0". Torque is then transmitted to the output shaft 4. The rotation speed of the fourth carrier Cp4 in this case is higher than the rotation speed of the fourth carrier Cp4 in the above-described second speed. Thus, torque obtained by reducing the rotation speed of the driving force source is transmitted to the output shaft 4, and the third speed having a lower speed ratio than the second speed is set.

The fourth speed (4th) is set by engaging the clutch C3, the brake B2 and the clutch D2 and releasing the clutch C1, the clutch C2, the brake B1, the brake B3 and the clutch D1. The state of the fourth speed is indicated by a straight line Lf4 of the front transmission unit Fr and a straight line Lr4 of the rear transmission unit Rr in the collinear diagram of FIG. 3. Specifically, torque is input from the input shaft 3 to the first carrier Cp1 and second ring gear Rp2 of the front transmission unit Fr via the clutch C3. Torque is input from the input shaft 3 to the third sun gear Sp3 and fourth sun gear Sp4 of the rear transmission unit Rr via the clutch D2. Torque input to the first carrier Cp1 and the second ring gear Rp2 is reduced in rotation speed and output from the second carrier Cp2 because the brake B2 is engaged. Torque output from the second carrier Cp2 is transmitted to the third ring gear Rp3 of the rear transmission unit Rr.

On the other hand, torque input to the third sun gear Sp3 and the fourth sun gear Sp4 is reduced in rotation speed and output from the fourth carrier Cp4 because the rotation speed of the third ring gear Rp3 is lower than the rotation speed of the input shaft 3. Torque is then transmitted to the output shaft 4. The rotation speed of the fourth carrier Cp4 in this case is higher than the rotation speed of the fourth carrier Cp4 in the case of the above-described third speed. Thus, torque obtained by reducing the rotation speed of the driving force source is transmitted to the output shaft 4, and the fourth speed having a lower speed ratio than the third speed is set.

The fifth speed (5th) is set by engaging the clutch C1, the brake B1 and the clutch D2 and releasing the clutch C2, the clutch C3, the brake B2, the brake B3 and the clutch D1. The state of the fifth speed is indicated by a straight line Lf5 of the front transmission unit Fr and a straight line Lr5 of the rear transmission unit Rr in the collinear diagram of FIG. 3. Specifically, torque is input from the input shaft 3 to the first sun gear Sp1 and second sun gear Sp2 of the front transmission unit Fr via the clutch C1. Torque is input from the input shaft 3 to the third sun gear Sp3 and fourth sun gear Sp4 of the rear transmission unit Rr via the clutch D2. Torque input to the first sun gear Sp1 and the second sun gear Sp2 is reduced in rotation speed and output from the second carrier Cp2 because the brake B1 is engaged. Torque output from the second carrier Cp2 is transmitted to the third ring gear Rp3 of the rear transmission unit Rr.

On the other hand, torque input to the third sun gear Sp3 and the fourth sun gear Sp4 is reduced in rotation speed and output from the fourth carrier Cp4 because the rotation speed of the third ring gear Rp3 is lower than the rotation speed of the input shaft 3. Torque is then transmitted to the output shaft 4. The rotation speed of the fourth carrier Cp4 in this case is higher than the rotation speed of the fourth carrier Cp4 in the case of the above-described fourth speed. Thus, torque obtained by reducing the rotation speed of the driving force source is transmitted to the output shaft 4, and the fifth speed having a lower speed ratio than the fourth speed is set.

The sixth speed (6th) is set by engaging the clutch C2, the brake B1 and the clutch D2 and releasing the clutch C1, the clutch C3, the brake B2, the brake B3 and the clutch D1. The state of the sixth speed is indicated by a straight line Lf6 of the front transmission unit Fr and a straight line Lr6 of the rear transmission unit Rr in the collinear diagram of FIG. 3. Specifically, torque is input from the input shaft 3 to the first ring gear Rp1 of the front transmission unit Fr via the clutch C2. Torque is input from the input shaft 3 to the third sun gear Sp3 and fourth sun gear Sp4 of the rear transmission unit Rr via the clutch D2. Torque input to the first ring gear Rpt is reduced in rotation speed and output from the second carrier Cp2 because the brake B1 is engaged. Torque output from the second carrier Cp2 is transmitted to the third ring gear Rp3 of the rear transmission unit Rr.

On the other hand, torque input to the third sun gear Sp3 and the fourth sun gear Sp4 is reduced in rotation speed and output from the fourth carrier Cp4 because the rotation speed of the third ring gear Rp3 is lower than the rotation speed of the input shaft 3. Torque is then transmitted to the output shaft 4. The rotation speed of the fourth carrier Cp4 in this case is higher than the rotation speed of the fourth carrier Cp4 in the case of the above-described fifth speed. Thus, torque obtained by reducing the rotation speed of the driving force source is transmitted to the output shaft 4, and the sixth speed having a lower speed ratio than the fifth speed is set.

The seventh speed (7th) is set by engaging the clutch C1 and the clutch C2, releasing the brake B1, the brake B2 and the brake B3 and engaging one of the clutch D1 and the clutch D2. For example, the seventh speed is allowed to be set by engaging the released clutch C1 and releasing the engaged brake B1 at the time of upshifting from the state of the above-described sixth speed. In this case, the clutch C2 and the clutch D2 each are kept in the engaged state, and the clutch D1, the brake B2 and the brake B3 each are kept in the released state. Alternatively, the seventh speed is allowed to be set by engaging the released clutch C1 and releasing the engaged brake B1 at the time of downshifting from the state of the eighth speed (described later). In this case, the clutch C2 and the clutch D1 each are kept in the engaged state, and the clutch D2, the brake B2 and the brake B3 each are kept in the released state.

In the automatic transmission 1 configured as shown in FIG. 1, the seventh speed is set as a so-called direct-coupling speed stage having a speed ratio of "1". The state of the seventh speed is indicated by a straight line Lf7 of the front transmission unit Fr and a straight line Lr7 of the rear transmission unit Rr in the collinear diagram of FIG. 3. For example, at the time of upshifting from any one of speed-reducing speed stages, including the first speed to the sixth speed, to the seventh speed, the seventh speed is set in a state where the clutch D1 is kept in the released state and the clutch D2 is kept in the engaged state. In this case, torque is input from the input shaft 3 to the first sun gear Sp1 and second sun gear Sp2 of the front transmission unit Fr via the clutch C1. Torque is input from the input shaft 3 to the first ring gear Rp1 of the front transmission unit Fr via the clutch C2. In addition, torque is input from the input shaft 3 to the third sun gear Sp3 and fourth sun gear Sp4 of the rear transmission unit Rr via the clutch D2. When torque of the input shaft 3 is input to both the first sun gear Sp1 and the second sun gear Sp2 and the first ring gear Rp1 at the same time, all the rotating elements of each of the first planetary gear train P1 and the second planetary gear train P2 rotate at the same rotation speed as the input shaft 3. That is, the whole of the front transmission unit Fr rotates integrally with the input shaft 3. Thus, torque input from the input shaft 3 to the front transmission unit Fr is directly output from the second carrier Cp2. Torque output from the second carrier Cp2 is transmitted to the third ring gear Rp3 of the rear transmission unit Rr.

For example, at the time of downshifting from any one of speed-increasing speed stages, including the eighth speed to the twelfth speed (described later), to the seventh speed, the seventh speed is set in a state where the clutch D1 is kept in the engaged state and the clutch D2 is kept in the released state. In this case, torque is input from the input shaft 3 to the first sun gear Sp1 and second sun gear Sp2 of the front transmission unit Fr via the clutch C1. Torque is input from the input shaft 3 to the first ring gear Rp1 of the front transmission unit Fr via the clutch C2. In addition, torque is input from the input shaft 3 to the third carrier Cp3 and fourth ring gear Rp4 of the rear transmission unit Rr via the clutch D1.

On the other hand, when the clutch D2 is engaged in the rear transmission unit Rr, torque is also input from the input shaft 3 to the third sun gear Sp3 and the fourth sun gear Sp4. Alternatively, when the clutch D1 is engaged, torque is also input from the input shaft 3 to the third carrier Cp3 and the fourth ring gear Rp4. In any case, torque of the input shaft 3 is input to any two of the rotating elements of the third planetary gear train P3 at the same time. Therefore, all the rotating elements of the third planetary gear train P3 rotate at the same rotation speed as the input shaft 3. Accordingly, all the rotating elements of the fourth planetary gear train P4 rotate at the same rotation speed as the input shaft 3. That is, the whole of the rear transmission unit Rr also rotates integrally with the input shaft 3. Thus, torque of the input shaft 3 is directly output from the fourth carrier Cp4. Torque is then transmitted to the output shaft 4. The rotation speed of the fourth carrier Cp4 in this case is the same as the rotation speed of the input shaft 3, and is higher than the rotation speed of the fourth carrier Cp4 in the case of the above-described sixth speed. Thus, torque in the same rotation speed as the rotation speed of the driving force source is transmitted to the output shaft 4, and the seventh speed having a lower speed ratio than the sixth speed and having a speed ratio of "1" is set.

The eighth speed (8th) is set by engaging the clutch C2, the brake B1 and the clutch D1 and releasing the clutch C1, the clutch C3, the brake B2, the brake B3 and the clutch D2. The state of the eighth speed is indicated by the straight line Lf6 of the front transmission unit Fr and a straight line Lr8 of the rear transmission unit Rr in the collinear diagram of FIG. 3. Specifically, torque is input from the input shaft 3 to the first ring gear Rp1 of the front transmission unit Fr via the clutch C2. Torque is input from the input shaft 3 to the third carrier Cp3 and fourth ring gear Rp4 of the rear transmission unit Rr via the clutch D1. Torque input to the first ring gear Rp1 is reduced in rotation speed and output from the second carrier Cp2 because the brake B1 is engaged. Torque output from the second carrier Cp2 is transmitted to the third ring gear Rp3 of the rear transmission unit Rr.

On the other hand, torque input to the third sun gear Sp3 and the fourth sun gear Sp4 is reduced in rotation speed and output from the fourth carrier Cp4 because the rotation speed of the third ring gear Rp3 is lower than the rotation speed of the input shaft 3. Torque is then transmitted to the output shaft 4. The rotation speed of the fourth carrier Cp4 in this case is higher than the rotation speed of the fourth carrier Cp4 in the case of the above-described seventh speed. Thus, torque obtained by increasing the rotation speed of the driving force source is transmitted to the output shaft 4, and the eighth speed having a lower speed ratio than the seventh speed is set.

The ninth speed (9th) is set by engaging the clutch C1, the brake B1 and the clutch D1 and releasing the clutch C2, the clutch C3, the brake B2, the brake B3 and the clutch D2. The state of the ninth speed is indicated by the straight line Lf5 of the front transmission unit Fr and a straight line Lr9 of the rear transmission unit Rr in the collinear diagram of FIG. 3. Specifically, torque is input from the input shaft 3 to the first sun gear Sp1 and second sun gear Sp2 of the front transmission unit Fr via the clutch C1. Torque is input from the input shaft 3 to the third carrier Cp3 and fourth ring gear Rp4 of the rear transmission unit Rr via the clutch D1. Torque input to the first ring gear Rp1 is reduced in rotation speed and output from the second carrier Cp2 because the brake B1 is engaged. Torque output from the second carrier Cp2 is transmitted to the third ring gear Rp3 of the rear transmission unit Rr.

On the other hand, torque input to the third sun gear Sp3 and the fourth sun gear Sp4 is increased in the rotation speed and output from the fourth carrier Cp4 because the rotation speed of the third ring gear Rp3 is lower than the rotation speed of the input shaft 3. Torque is then transmitted to the output shaft 4. The rotation speed of the fourth carrier Cp4 in this case is higher than the rotation speed of the fourth carrier Cp4 in the case of the above-described eighth speed. Thus, torque obtained by increasing the rotation speed of the driving force source is transmitted to the output shaft 4, and the ninth speed having a lower speed ratio than the eighth speed is set.

The tenth speed (10th) is set by engaging the clutch C3, the brake B2 and the clutch D1 and releasing the clutch C1, the clutch C2, the brake B1, the brake B3 and the clutch D2. The state of the tenth speed is indicated by the straight line Lf4 of the front transmission unit Fr and a straight line Lr10 of the rear transmission unit Rr in the collinear diagram of FIG. 3. Specifically, torque is input from the input shaft 3 to the first carrier Cp1 and second ring gear Rp2 of the front transmission unit Fr via the clutch C3. Torque is input from the input shaft 3 to the third carrier Cp3 and fourth ring gear Rp4 of the rear transmission unit Rr via the clutch D1. Torque input to the first carrier Cp1 and the second ring gear Rp2 is reduced in rotation speed and output from the second carrier Cp2 because the brake B2 is engaged. Torque output from the second carrier Cp2 is transmitted to the third ring gear Rp3 of the rear transmission unit Rr.

On the other hand, torque input to the third carrier Cp3 and the fourth ring gear Rp4 is increased in rotation speed and output from the fourth carrier Cp4 because the rotation speed of the third ring gear Rp3 is lower than the rotation speed of the input shaft 3. Torque is then transmitted to the output shaft 4. The rotation speed of the fourth carrier Cp4 in this case is higher than the rotation speed of the fourth carrier Cp4 in the case of the above-described ninth speed. Thus, torque obtained by increasing the rotation speed of the driving force source is transmitted to the output shaft 4, and the tenth speed having a lower speed ratio than the ninth speed is set.

The eleventh speed (11th) is set by engaging the brake B1, the brake B2 and the clutch D1 and releasing the clutch C1, the clutch C2, the clutch C3, the brake B3 and the clutch D2. The state of the tenth speed is indicated by the straight line Lf3 of the front transmission unit Fr and a straight line Lr11 of the rear transmission unit Rr in the collinear diagram of FIG. 3. Specifically, when both the brake B1 and the brake B2 are engaged, all the rotation speeds of the rotating elements of the front transmission unit Fr are "0". Accordingly, the rotation speed of the third ring gear Rp3 of the rear transmission unit Rr that is coupled to the second carrier Cp2 of the front transmission unit Fr is also "0".

On the other hand, torque is input from the input shaft 3 to the third carrier Cp3 and fourth ring gear Rp4 of the rear transmission unit Rr via the clutch D1. Torque input to the third carrier Cp3 and the fourth ring gear Rp4 is reduced in rotation speed and output from the fourth carrier Cp4 because the rotation speed of the third ring gear Rp3 is fixed to "0". Torque is then transmitted to the output shaft 4. The rotation speed of the fourth carrier Cp4 in this case is higher than the rotation speed of the fourth carrier Cp4 in the case of the above-described tenth speed. Thus, torque obtained by increasing the rotation speed of the driving force source is transmitted to the output shaft 4, and the eleventh speed having a further lower speed ratio than the tenth speed is set.

The twelfth speed (12th) is set by engaging the clutch C1, the brake B2 and the clutch D1 and releasing the clutch C2, the clutch C3, the brake B1, the brake B3 and the clutch D2. The state of the twelfth speed is indicated by the straight line Lf1 of the front transmission unit Fr and a straight line Lr12 of the rear transmission unit Rr in the collinear diagram of FIG. 3. Specifically, torque is input from the input shaft 3 to the first sun gear Sp1 and second sun gear Sp2 of the front transmission unit Fr via the clutch C1. Torque is input from the input shaft 3 to the third carrier Cp3 and fourth ring gear Rp4 of the rear transmission unit Rr via the clutch D1. Torque input to the first sun gear Sp1 and the second sun gear Sp2 is output from the second carrier Cp2 because the brake B2 is engaged. The second carrier Cp2 rotates in a direction opposite to the rotation direction of the input shaft 3. Torque output from the second carrier Cp2 is transmitted to the third ring gear Rp3 of the rear transmission unit Rr.

On the other hand, torque input to the third carrier Cp3 and the fourth ring gear Rp4 is significantly reduced in rotation speed and output from the fourth carrier Cp4 because the third ring gear Rp3 rotates together with the second carrier Cp2 in a direction opposite to the rotation direction of the input shaft 3. Torque is then transmitted to the output shaft 4. Thus, torque obtained by significantly increasing the rotation speed of the driving force source is transmitted to the output shaft 4. That is, the twelfth speed having the minimum speed ratio is set.

In the automatic transmission 1 configured as shown in FIG. 1, the engagement states of the clutch D1 and clutch D2 are interchanged between speed-reducing speed stages, including the first speed to the sixth speed, and speed-increasing speed stages, including the eighth speed to the twelfth speed. That is, in the speed-reducing speed stages including the first speed to the sixth speed, it is indispensable that the clutch D1 is released and the clutch D2 is engaged. In contrast, in the speed-increasing speed stages including the eighth speed to the twelfth speed, it is indispensable that the clutch D1 is engaged and the clutch D2 is released. As described above, because the clutch D1 and the clutch D2 are dog clutches, when an operation to engage or release those clutch D1 and clutch D2 is carried out, it is required to synchronize the rotation speeds of the rotating members that are engaged with each other by the clutch D1 and the clutch D2. Alternatively, the clutch D1 and the clutch D2 are required to be placed in a no-load state. In contrast, the automatic transmission 1 according to the invention is configured such that, when the seventh speed is set, the rotation speeds of the rotating members that are engaged with each other by the clutch D1 and the clutch D2 are synchronized or the clutch D1 and the clutch D2 each are placed in a no-load state.

As described above, the automatic transmission 1 is configured so that the seventh speed is a direct-coupling speed stage having a speed ratio of "1". Therefore, in the state where the seventh speed is set, all the first planetary gear train P1, the second planetary gear train P2, the third planetary gear train P3 and the fourth planetary gear train P4 rotate integrally with the input shaft 3. Thus, in the state where the seventh speed is set, the third carrier Cp3 and the fourth ring gear Rp4 that are selectively coupled to the input shaft 3 by the clutch D1 each also rotate at the same rotation speed as the input shaft 3. Similarly, the third sun gear Sp3 and the fourth sun gear Sp4 that are selectively coupled to the input shaft 3 by the clutch D2 each also rotate at the same rotation speed as the input shaft 3.

In this way, in the automatic transmission 1 according to the invention, the seventh speed is set by keeping each of the clutch D1 and the clutch D2, which are dog clutches, in the engaged state or the released state and changing the engaged or released state of each of other engagement mechanisms (specifically the clutch C1 and the brake B1) other than those dog clutches D1, D2. The automatic transmission 1 is configured such that the rotation speeds of the rotating members that are engaged by the clutch D1 and the rotation speeds of the rotating members that are engaged by the clutch D2 all coincide with one another in the seventh speed. In other words, in the automatic transmission 1 according to the invention, the clutch D1 and the clutch D2 that are dog clutches are arranged so as to be indicated on a line (that is, the straight line Lin that indicates the rotation speed of the input shaft 3) at which the rotation speeds are the same in the collinear diagram for the planetary gear trains P1, P2, P3, P4 as shown in FIG. 3. The seventh speed that is set by the automatic transmission 1 is a speed stage having a speed ratio of "1" as described above. The seventh speed that is set by the automatic transmission 1 is a speed stage between the speed-reducing speed stages, including the first speed to the sixth speed and having higher speed ratios, and the speed-increasing speed stages, including the eighth speed to the twelfth speed and having lower speed ratios.

Thus, in the automatic transmission 1 according to the invention, when the seventh speed is set, all the rotation speeds of the rotating members that are coupled by the clutch D1 and the clutch D2 coincide with one another. Therefore, between the clutch D1 and the clutch D2, for example, in the released clutch D1 (or clutch D2), the rotation speeds of the two rotating members that are engaged thereafter are synchronized with each other. In the engaged clutch D2 (or clutch D1), no load is applied between the two rotating members that are released thereafter by engaging the other released clutch D1 (or clutch D2) to once set both the clutch D1 and the clutch D2 in the engaged state. Thus, by setting the seventh speed, each of the clutch D1 and the clutch D2 is operable to be engaged or released. In this state, by engaging the clutch D1 and releasing the clutch D2, it is possible to set any one of the speed-increasing speed stages including the eighth speed to the twelfth speed. Alternatively, by releasing the clutch D1 and engaging the clutch D2, it is possible to set any one of the speed-reducing speed stages including the first speed to the sixth speed. Therefore, with the automatic transmission 1 according to the invention, for example, without providing a special device or mechanism, such as a synchromesh mechanism, it is possible to bring the rotation speeds of the rotating members that are coupled by the clutch D1 and the clutch D2 into coincidence with one another. Alternatively, without executing special control for only the purpose of that, it is possible to bring the rotation speeds of the rotating members that are coupled by the clutch D1 and the clutch D2 into coincidence with one another. Because the other engagement mechanisms other than the clutch D1 or the clutch D2 are not engaged only in order to operate the clutch D1 or the clutch D2 as described above, it is possible to suppress a decrease in the durability of those other engagement devices.

In contrast to the forward speed stages including the first speed to the twelfth speed that are set as described above, the reverse speed stage (Rev) is set by engaging the clutch C3, the brake B2 and the brake B3 and releasing the clutch C1, the clutch C2, the brake B1, the clutch D1 and the clutch D2. The state of the reverse speed stage is indicated by the straight line Lf4 of the front transmission unit Fr and a straight line Lr13 of the rear transmission unit Rr in the collinear diagram of FIG. 3. Specifically, torque is input from the input shaft 3 to the first carrier Cp1 and second ring gear Rp2 of the front transmission unit Fr via the clutch C3. Torque input to those first carrier Cp1 and second ring gear Rp2 is reduced in rotation speed and output from the second carrier Cp2 because the brake B2 is engaged. Torque output from the second carrier Cp2 is transmitted to the third ring gear Rp3 of the rear transmission unit Rr.

On the other hand, torque input to the third ring gear Rp3 is output from the fourth carrier Cp4 because the brake B3 is engaged. The fourth carrier Cp4 rotates in a direction opposite to the rotation direction of the input shaft 3. Torque is then transmitted to the output shaft 4. The rotation speed of the fourth carrier Cp4 in this case is lower than the rotation speed of the input shaft 3. Thus, torque obtained by reducing the rotation speed of the driving force source is transmitted to the output shaft 4. The torque rotates in a direction opposite to the rotation direction of the input shaft 3. That is, the reverse speed stage is set.

The above-described reverse speed stage is set after the automatic transmission 1 is once changed from a state where any one of the forward speed stages is set to a neutral state. Alternatively, the reverse speed stage is set from the state where the neutral state is set in the automatic transmission 1. The neutral state of the automatic transmission 1 is set by releasing all the clutches C1, C2, C3, D1, D2 and the brakes B1, B2, B3. Thus, when the reverse speed stage is set, the clutch D1 and the clutch D2 are once placed in a no-load state. Therefore, in order to set the reverse speed stage, it is allowed to release the clutch D1 and the clutch D2 that are dog clutches.

Figure 4:
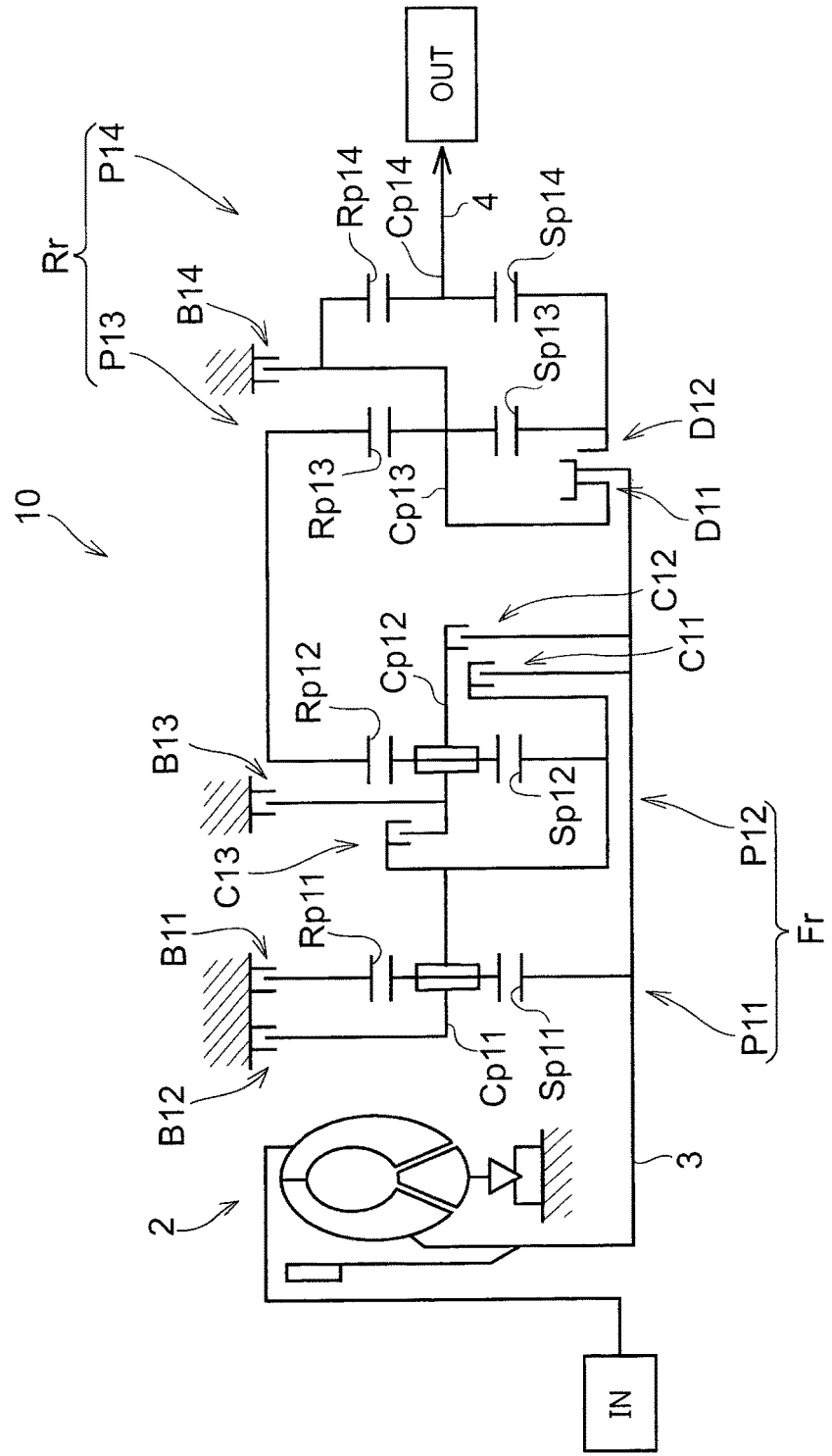
FIG. 4 is a skeletal view for illustrating another example of a gear train of the automatic transmission according to the invention.

FIG. 4 shows another example of a gear train of a transmission to which the invention is applied. The gear train shown in FIG. 4 is an example in which the transmission that is able to set twelve forward speed stages and one reverse speed stage includes four planetary gear trains and nine engagement mechanisms.

In FIG. 4, an automatic transmission 10 includes four planetary gear trains, that is, a first planetary gear train P11, a second planetary gear train P12, a third planetary gear train P13 and a fourth planetary gear train P14. Those four planetary gear trains are arranged in series in order of the first planetary gear train P11, the second planetary gear train P12, the third planetary gear train P13 and the fourth planetary gear train P14 from the side close to the input shaft 3 (from the left side in FIG. 4). In the example shown in FIG. 4, the above-described first planetary gear train P11, second planetary gear train P12, third planetary gear train P13 and fourth planetary gear train P14 are examples of "four planetary gear trains" according to the invention.

The first planetary gear train P11 is a double-pinion-type planetary gear train. Specifically, the first planetary gear train P11 includes a first sun gear Sp11, a first ring gear Rp11 and a first carrier Cp11. The first ring gear Rp11 is arranged concentrically with the first sun gear Sp11. The first carrier Cp11 holds pairs of two pinion gears (not shown) such that the pairs of two pinion gears are rotatable and revolvable. Each pair of two pinion gears are in mesh with these first sun gear Sp11 and first ring gear Rp11.

The second planetary gear train P12 is a double-pinion-type planetary gear train. Specifically, the second planetary gear train P12 includes a second sun gear Sp12, a second ring gear Rp12 and a second carrier Cp12. The second ring gear Rp12 is arranged concentrically with the second sun gear Sp12. The second carrier Cp12 holds pairs of pinion gears (not shown) such that the pairs of pinion gears are rotatable and revolvable. Each pair of pinion gears are in mesh with these second sun gear Sp12 and second ring gear Rp12.

The third planetary gear train P13 is a single-pinion-type planetary gear train. Specifically, the third planetary gear train P13 includes a third sun gear Sp13, a third ring gear Rp13 and a third carrier Cp13. The third ring gear Rp13 is arranged concentrically with the third sun gear Sp13. The third carrier Cp13 holds pinion gears (not shown) such that the pinion gears are rotatable and revolvable. Each pinion gear is in mesh with these third sun gear Sp13 and third ring gear Rp13.

The fourth planetary gear train P14 is a single-pinion-type planetary gear train. Specifically, the fourth planetary gear train P14 includes a fourth sun gear Sp14, a fourth ring gear Rp14 and a fourth carrier Cp14. The fourth ring gear Rp14 is arranged concentrically with the fourth sun gear Sp14. The fourth carrier Cp14 holds pinion gears (not shown) such that the pinion gears are rotatable and revolvable. Each pinion gear is in mesh with these fourth sun gear Sp14 and fourth ring gear Rp14.

Adjacent two of the above-described planetary gear trains P11, P12, P13, P14 are coupled to each other. That is, the first carrier Cp11 of the first planetary gear train P11 and the second sun gear Sp12 of the second planetary gear train P12 are coupled to each other. The second ring gear Rp12 of the second planetary gear train P12 and the third ring gear Rp13 of the third planetary gear train P13 are coupled to each other. The third carrier Cp13 of the third planetary gear train P13 and the fourth ring gear Rp14 of the fourth planetary gear train P14 are coupled to each other. The third sun gear Sp13 of the third planetary gear train P13 and the fourth sun gear Sp14 of the fourth planetary gear train P14 are coupled to each other. The first sun gear Sp11 of the first planetary gear train P11 is coupled to the input shaft 3. The fourth carrier Cp14 of the fourth planetary gear train P14 is coupled to the output shaft 4.

In the example shown in FIG. 4, among the above-described four planetary gear trains P11, P12, P13, P14, the first planetary gear train P11 is an example of the first planetary gear train according to the invention, the first sun gear Sp11, first ring gear Rp11 and first carrier Cp11 of the first planetary gear train P11 are respectively examples of the first rotating element, the second rotating element and the third rotating element according to the invention. The second planetary gear train P12 is an example of the second planetary gear train according to the invention. The second sun gear Sp12, second ring gear Rp12 and second carrier Cp12 of the second planetary gear train P12 are respectively examples of the fourth rotating element, the fifth rotating element and the sixth rotating element according to the invention. The third planetary gear train P13 is an example of the third planetary gear train according to the invention. The third sun gear Sp13, third carrier Cp13 and third ring gear Rp13 of the third planetary gear train P13 are respectively examples of the seventh rotating element, the eighth rotating element and the ninth rotating element according to the invention. The fourth planetary gear train P14 is an example of the fourth planetary gear train according to the invention. The fourth sun gear Sp14, fourth carrier Cp14 and fourth ring gear Rp14 of the fourth planetary gear train P14 are respectively examples of the tenth rotating element, the eleventh rotating element and the twelfth rotating element according to the invention.

A clutch C11 is provided between the input shaft 3 and the second planetary gear train P12. The clutch C11 selectively couples the input shaft 3 to the second sun gear Sp12 of the second planetary gear train P12. The clutch C11 is a friction clutch that engages rotating members with each other by friction force. The rotating members rotate relative to each other.

A clutch C12 is provided between the input shaft 3 and the second planetary gear train P12. The clutch C12 selectively couples the input shaft 3 to the second carrier Cp12 of the second planetary gear train P12. The clutch C12, as well as the above-described clutch C11, is a friction clutch that engages rotating members with each other by friction force. The rotating members rotate relative to each other.

A clutch C13 is provided between the first planetary gear train P11 and the second planetary gear train 12. The clutch C13 selectively couples the first carrier Cp11 of the first planetary gear train P11 to the second carrier Cp12 of the second planetary gear train P12. The clutch C13, as well as the above-described clutches C11, C12, is a friction clutch that engages rotating members with each other by friction force. The rotating members rotate relative to each other.

A brake B11 is provided in the first ring gear Rp11 of the first planetary gear train P11. The brake B11 selectively stops rotation of the first ring gear Rp11. The brake B11 is a friction brake that engages a rotating member with a fixed member by friction force.

A brake B12 is provided in the first carrier Cp11 of the first planetary gear train P11. The brake B12 selectively stops rotation of the first carrier Cp11. The brake B12, as well as the above-described brake B11, is a friction brake that engages a rotating member with a fixed member by friction force.

A brake B13 is provided in the second carrier Cp12 of the second planetary gear train P12. The brake B13 selectively stops rotation of the second carrier Cp12. The brake B13, as well as the above-described brakes B11, B12, is a friction brake that engages a rotating member with a fixed member by friction force.

A brake B14 is provided in the third carrier Cp13 of the third planetary gear train P13 and the fourth ring gear Rp14 of the fourth planetary gear train P14. The brake B14 selectively stops rotation of those third carrier Cp13 and fourth ring gear Rp14. The brake B14, as well as the above-described brakes B11, B12, B13, is a friction brake that engages a rotating member with a fixed member by friction force.

A clutch D11 is provided between the input shaft 3 and the third planetary gear train P13. The clutch D11 selectively couples the input shaft 3 to the third carrier Cp13 of the third planetary gear train P13. The clutch D11 is arranged on the input shaft 3 or on a rotary shaft connected to the input shaft 3. The clutch D11 is a dog clutch that meshes and mechanically engages rotating members with each other. The rotating members rotate relative to each other.

A clutch D12 is provided between the input shaft 3 and the third planetary gear train P13. The clutch D12 selectively couples the input shaft 3 to the third sun gear Sp13 of the third planetary gear train P13. The clutch D12 together with the above-described clutch D11 is arranged on the input shaft 3 or on a rotary shaft connected to the input shaft 3. The clutch D12, as well as the above-described clutch D11, is a dog clutch that meshes and mechanically engages rotating members with each other. The rotating members rotate relative to each other.

In the example shown in FIG. 4, the above-described input shaft 3 is an example of the "first rotating member" according to the invention, and the third carrier Cp13 is an example of the "second rotating member" according to the invention. In addition, the third carrier Cp13 is an example of the "first element" of the rear transmission unit Rr according to the invention. Thus, the clutch D11 is an example of the "first dog clutch" according to the invention. The above-described third sun gear Sp13 is an example of the "third rotating member" according to the invention. In addition, the third sun gear Sp13 is an example of the "second element" of the rear transmission unit Rr (described later). Thus, the clutch D12 is an example of the "second dog clutch" according to the invention. As described above, the nine engagement mechanisms, that is, the clutches C11, C12, C13 that are the friction clutches, the brakes B11, B12, B13, B14 that are the friction brakes and the clutches D11, D12 that are the dog clutches, are examples of the "plurality of engagement mechanisms" according to the invention.

Among the above-described "plurality of engagement mechanisms", the clutches C11, C12, C13 and the brakes B11, B12, B13, B14 are examples of the "other engagement mechanisms" according to the invention. Particularly, the clutch C11 is a friction clutch that selectively couples the second sun gear Sp12 (fourth rotating element) to the input shaft 3, and is an example of the "first friction clutch" according to the invention. The clutch C12 is a friction clutch that selectively couples the second carrier Cp12 (sixth rotating element) to the input shaft 3, and is an example of the "second friction clutch" according to the invention. The clutch C13 is a friction clutch that selectively couples the first carrier Cp11 (third rotating element) to any two of the second sun gear Sp12 (fourth rotating element), the second ring gear Rp12 (fifth rotating element) and the second carrier Cp12 (sixth rotating element), and is an example of the "third friction clutch" according to the invention. In the example shown in FIG. 6, the clutch C13 is configured to selectively couple the first carrier Cp11 (third rotating element) to both the second sun gear Sp12 (fourth rotating element) and the second carrier Cp12 (sixth rotating element). The brake B11 is a friction brake that selectively fixes the first ring gear Rp11 (second rotating element) in a non-rotatable state, and is an example of the "first friction brake" according to the invention. The brake B12 is a friction brake that selectively fixes the first carrier Cp11 (third rotating element) in a non-rotatable state, and is an example of the "second friction brake" according to the invention. The brake B13 is a friction brake that selectively fixes the second carrier Cp12 (sixth rotating element) in a non-rotatable state, and is an example of the "third friction brake" according to the invention. The brake B14 is a friction brake that selectively fixes both the third carrier Cp13 (eighth rotating element) and the fourth ring gear Rp14 (twelfth rotating element) in a non-rotatable state. That is, the brake B14 is a friction brake that selectively fixes at least one of the rotating elements of the third planetary gear train P13 or the rotating elements of the fourth planetary gear train P14 in a non-rotatable state. Thus, the brake B14 is an example of a "fourth friction brake" according to the invention.

Figure 6:
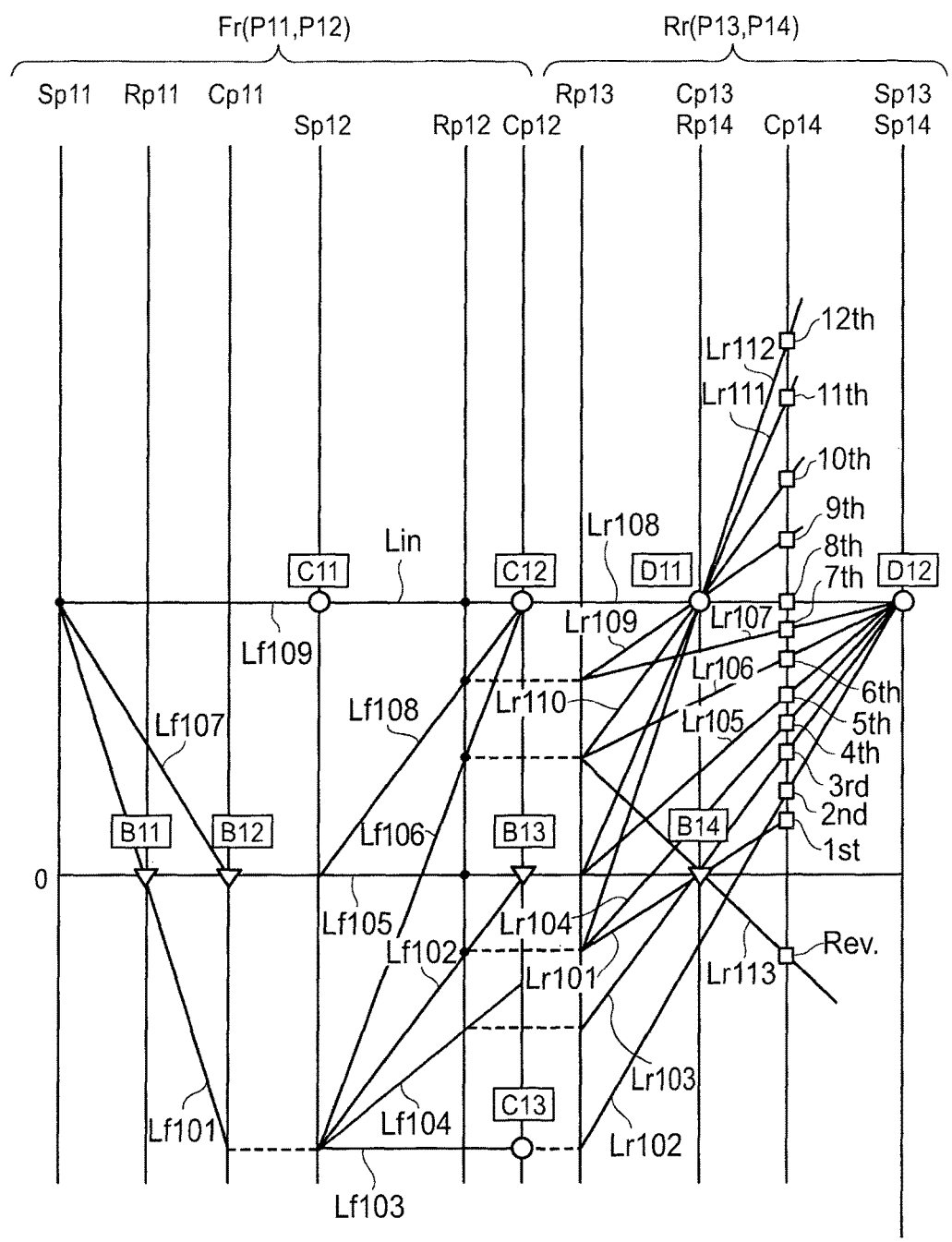
FIG. 6 is a collinear diagram that shows states of rotating elements in each of planetary gear trains that are used in the vehicle automatic transmission shown in FIG. 4.

The thus configured automatic transmission 10 is able to set twelve forward speed stages and one reverse speed stage by operating the engagement mechanisms of the clutches C11, C12, C13, the brakes B11, B12, B13, B14 and the clutches D11, D12. The table of FIG. 5 shows engaged and released states of the engagement mechanisms corresponding to each speed stage. In FIG. 5, as in the case of FIG. 2, "+" indicates an engaged state, and the blank indicates a released state. "*" indicates that one of the clutch D11 and the clutch D12 is in an engaged state or both the clutch D11 and the clutch D12 are in an engaged state. The collinear diagram of FIG. 6 shows states of the planetary gear trains P11, P12, P13, P14 in a state where each speed stage is set. In FIG. 6, the left-side six vertical lines (line segments) respectively represent the rotating elements (the first sun gear Sp11, the first ring gear Rp11, the first carrier Cp11, the second sun gear Sp12, the second ring gear Rp12, and the second carrier Cp12) in the front transmission unit Fr including the first planetary gear train P11 and the second planetary gear train P12. These left-side six vertical lines are arranged parallel to one another at intervals based on a gear ratio among the rotating elements in the first planetary gear train P11 and the second planetary gear train P12. On the other hand, the right-side four vertical lines (line segments) represent the rotating elements (the third sun gear Sp13, the third ring gear Rp13, the third carrier Cp13, the fourth sun gear Sp14, the fourth ring gear Rp14, and the fourth carrier Cp14) in the rear transmission unit Rr including the third planetary gear train P13 and the fourth planetary gear train P14. These right-side four vertical lines are also arranged parallel to one another at intervals based on a gear ratio among the rotating elements in the third planetary gear train P13 and the fourth planetary gear train P14. A horizontal line intersecting at right angles with the above-described left-side six vertical lines and right-side four vertical lines and indicated by "0" is a base line at which the rotation speed is "0". A point that indicates a distance from the base line along each of the above-described vertical lines represents the rotation speed of a corresponding one of the rotating elements. A straight line Lin is a horizontal line that indicates the rotation speed of the input shaft 3.

As shown in FIG. 5, the first speed (1st) is set by engaging the brake B11, the brake B13 and the brake B14 and releasing the clutch C11, the clutch C12, the clutch C13, the brake B12, the clutch D11 and the clutch D12. The state of the first speed is indicated by a straight line Lf101 and straight line Lf102 of the front transmission unit Fr and a straight line Lr101 of the rear transmission unit Rr in the collinear diagram of FIG. 6. Specifically, torque is input from the input shaft 3 to the first sun gear Sp11 of the front transmission unit Fr. Torque input to the first sun gear Sp11 is output from the first carrier Cp11 because the brake B11 is engaged. The first carrier Cp11 rotates in a direction opposite to the rotation direction of the input shaft 3. Torque output from the first carrier Cp11 is transmitted to the second sun gear Sp12 of the front transmission unit Fr. Torque transmitted to the second sun gear Sp12 is reduced in rotation speed as compared to the rotation speed of the second carrier Cp12 and output from the second ring gear Rp12 because the brake B13 is engaged. The rotation direction of the second ring gear Rp12 in this case is still the rotation direction opposite to the rotation direction of the input shaft 3.

On the other hand, torque output from the second ring gear Rp12 is transmitted to the third ring gear Rp13 of the rear transmission unit Rr. Torque transmitted to the third ring gear Rp13 is output from the fourth carrier Cp14 because the brake B14 is engaged. The fourth carrier Cp14 rotates in a direction opposite to the rotation direction of the third ring gear Rp13. That is, torque is output from the fourth carrier Cp14 that rotates in the same direction as the input shaft 3. Torque is then transmitted to the output shaft 4. The rotation speed of the fourth carrier Cp14 in this case is significantly lower than the rotation speed of the input shaft 3. Thus, torque obtained by significantly reducing the rotation speed of the driving force source is transmitted to the output shaft 4. That is, the first speed having the maximum speed ratio is set.

At the time of upshifting from the thus set first speed to the second speed (described later), initially, the brake B13 is gradually released while the brake B14 is kept in the engaged state. The clutch C13 is gradually engaged. Because the brake B13 is released and the clutch C13 is engaged, the rotation speeds of the second carrier Cp12 and second sun gear Sp12 are gradually increased toward the rotation speed of the first carrier Cp11 that is rotating in the direction opposite to the rotation direction of the input shaft 3. As the rotation speeds of the second carrier Cp12 and second sun gear Sp12 are gradually increased in the rotation direction opposite to the rotation direction of the input shaft 3, the rotation speed of the second ring gear Rp12 and the rotation speed of the third ring gear Rp13 coupled to the second ring gear Rp12 are also gradually increased in the rotation direction opposite to the rotation direction of the input shaft 3. Because the rotation speed of the third ring gear Rp13 is increased in the rotation direction opposite to the rotation direction of the input shaft 3 in a state where the brake B14 is engaged, the rotation speeds of the third sun gear Sp13 and fourth sun gear Sp14 are gradually increased in the same rotation direction as the input shaft 3. After that, the rotation speeds of the third sun gear Sp13 and fourth sun gear Sp14 coincide with the rotation speed of the input shaft 3 at predetermined timing. That is, the rotation speeds of the input shaft 3 and third sun gear Sp13 that are engaged with each other by the clutch D12 are synchronized with each other, so the released clutch D12 is allowed to be engaged. The clutch D12 is engaged in this state. After that, the brake B14 is released, the clutch C13 is completely engaged, and the brake B13 is completely released. Thus, the third ring gear Rp13 rotates in the rotation direction opposite to the rotation direction of the input shaft 3 at the same rotation speed as the rotation speed of the first carrier Cp11, and the upshift from the first speed to the second speed completes.

A downshift from the second speed to the first speed may be carried out in order inverted from the case of the upshift from the first speed to the second speed. That is, in a state where the second speed is set by engaging the clutch C13, the brake B11 and the clutch D12, initially, the clutch C13 is gradually released, and the brake B13 is gradually engaged. The brake B14 is engaged. Because the operations of the clutch C13 and brake B13 are controlled at predetermined timing at which the brake B14 is engaged, the clutch D12 is released in a state where the clutch D12 is placed in a no-load state and the engaged clutch D12 is allowed to be released. After that, the brake B14 is engaged, the clutch C13 is completely released, and the brake B13 is completely engaged. Thus, the third ring gear Rp13 rotates in the direction opposite to the rotation direction of the input shaft 3 at the same rotation speed as the rotation speed of the second ring gear Rp12. The rotation speed of the second ring gear Rp12 is lower than the rotation speed of the first carrier Cp11. Thus, the downshift from the second speed to the first speed completes.

As described above, the second speed (2nd) is set by engaging the clutch C13, the brake B11 and the clutch D12 and releasing the clutch C11, the clutch C12, the brake B12, the brake B13, the brake B14 and the clutch D11. The state of the second speed is indicated by the straight line Lf101 and straight line Lf103 of the front transmission unit Fr and a straight line Lr102 of the rear transmission unit Rr in the collinear diagram of FIG. 6. Specifically, torque is input from the input shaft 3 to the first sun gear Sp11 of the front transmission unit Fr. Torque is input from the input shaft 3 to the third sun gear Sp13 and fourth sun gear Sp14 of the rear transmission unit Rr via the clutch D12. Torque input to the first sun gear Sp11 is output from the first carrier Cp11 because the brake B11 is engaged. The first carrier Cp11 rotates in the direction opposite to the rotation direction of the input shaft 3. Torque output from the first carrier Cp11 is transmitted to the second sun gear Sp12 of the front transmission unit Fr. In this case, because the clutch C13 is engaged, the whole of the second planetary gear train P12 integrally rotates. Thus, torque transmitted to the second sun gear Sp12 is directly transmitted to the third ring gear Rp13 of the rear transmission unit Rr via the second planetary gear train P12.

On the other hand, torque input to the third sun gear Sp13 and the fourth sun gear Sp14 via the clutch D12 is significantly reduced in rotation speed and output from the fourth carrier Cp14 because torque rotating in the direction opposite to the rotation direction of the input shaft 3 is input to the third ring gear Rp13 as described above. Torque is then transmitted to the output shaft 4. The rotation speed of the fourth carrier Cp14 in this case is higher than the rotation speed of the fourth carrier Cp14 in the case of the above-described first speed. Thus, torque obtained by reducing the rotation speed of the driving force source is transmitted to the output shaft 4, and the second speed having a lower speed ratio than the first speed is set.

The third speed (3rd) is set by engaging the brake B11, the brake B14 and the clutch D12 and releasing the clutch C11, the clutch C12, the clutch C13, the brake B12, the brake B13 and the clutch D11. The state of the third speed is indicated by the straight line Lf101 and straight line Lf104 of the front transmission unit Fr and a straight line Lr103 of the rear transmission unit Rr in the collinear diagram of FIG. 6. Specifically, torque is input from the input shaft 3 to the first sun gear Sp11 of the front transmission unit Fr. Torque is input from the input shaft 3 to the third sun gear Sp13 and fourth sun gear Sp14 of the rear transmission unit Rr via the clutch D12. Torque input to the first sun gear Sp11 is output from the first carrier Cp11 because the brake B11 is engaged. The first carrier Cp11 rotates in a direction opposite to the rotation direction of the input shaft 3. Torque output from the first carrier Cp11 is transmitted to the second sun gear Sp12 of the front transmission unit Fr. In this case, in the second planetary gear train P12, torque from the first carrier Cp11 is input to the second sun gear Sp12 as described above, and torque from the third ring gear Rp13 of the rear transmission unit Rr is input to the second ring gear Rp12 as will be described later. Thus, the second planetary gear train P12 differentially rotates on the basis of torque input to the second sun gear Sp12 and the second ring gear Rp12 and the gear ratio among the rotating elements.

On the other hand, torque input to the third sun gear Sp13 and the fourth sun gear Sp14 via the clutch D12 is reduced in rotation speed and output from the fourth carrier Cp14 because the brake B14 is engaged and the rotation speeds of the third carrier Cp13 and fourth ring gear Rp14 are fixed to "0". Torque is then transmitted to the output shaft 4. The rotation speed of the fourth carrier Cp14 in this case is higher than the rotation speed of the fourth carrier Cp14 in the case of the above-described second speed. Thus, torque obtained by reducing the rotation speed of the driving force source is transmitted to the output shaft 4, and the third speed having a lower speed ratio than the second speed is set. The third ring gear Rp13 in this case rotates in the direction opposite to the rotation direction of the input shaft 3 because the rotation speeds of the third carrier Cp13 and fourth ring gear Rp14 are fixed to "0" as described above, and the rotation speed of the third ring gear Rp13 is increased. Torque is transmitted from the third ring gear Rp13 to the second ring gear Rp12 of the front transmission unit Fr.

The fourth speed (4th) is set by engaging the brake B11, the brake B13 and the clutch D12 and releasing the clutch C11, the clutch C12, the clutch C13, the brake B12, the brake B14 and the clutch D11. The state of the fourth speed is indicated by the straight line Lf101 and straight line Lf102 of the front transmission unit Fr and a straight line Lr104 of the rear transmission unit Rr in the collinear diagram of FIG. 6. Specifically, torque is input from the input shaft 3 to the first sun gear Sp11 of the front transmission unit Fr. Torque is input from the input shaft 3 to the third sun gear Sp13 and fourth sun gear Sp14 of the rear transmission unit Rr via the clutch D12. Torque input to the first sun gear Sp11 is output from the first carrier Cp11 because the brake B11 is engaged. The first carrier Cp11 rotates in a direction opposite to the rotation direction of the input shaft 3. Torque output from the first carrier Cp11 is transmitted to the second sun gear Sp12 of the front transmission unit Fr. Torque transmitted to the second sun gear Sp12 is reduced in rotation speed as compared to the rotation speed of the second carrier Cp12 and output from the second ring gear Rp12 because the brake B13 is engaged. The rotation direction of the second ring gear Rp12 in this case is still the direction opposite to the rotation direction of the input shaft 3. Torque output from the second ring gear Rp12 is transmitted to the third ring gear Rp13 of the rear transmission unit Rr.

On the other hand, torque input to the third sun gear Sp13 and the fourth sun gear Sp14 via the clutch D12 is reduced in rotation speed and output from the fourth carrier Cp14 because torque rotating in the direction opposite to the rotation direction of the input shaft 3 is input to the third ring gear Rp13 as described above. Torque is then transmitted to the output shaft 4. The rotation speed of the fourth carrier Cp14 in this case is higher than the rotation speed of the fourth carrier Cp14 in the case of the above-described third speed. Thus, torque obtained by reducing the rotation speed of the driving force source is transmitted to the output shaft 4, and the fourth speed having a lower speed ratio than the third speed is set.

The fifth speed (5th) is set by engaging the brake B12, the brake B13 and the clutch D12 and releasing the clutch C11, the clutch C12, the clutch C13, the brake B11, the brake B14 and the clutch D11. The state of the fifth speed is indicated by a straight line Lf105 of the front transmission unit Fr and a straight line Lr105 of the rear transmission unit Rr in the collinear diagram of FIG. 6. Specifically, because both the brake B12 and the brake B13 are engaged, all the rotation speeds of the rotating elements of the second planetary gear train P12 are "0". Accordingly, the rotation speed of the third ring gear Rp13 of the rear transmission unit Rr coupled to the second ring gear Rp12 of the second planetary gear train P12 is also "0". Torque is input from the input shaft 3 to the third sun gear Sp13 and fourth sun gear Sp14 of the rear transmission unit Rr via the clutch D12. Torque input to the third sun gear Sp13 and the fourth sun gear Sp14 is reduced in rotation speed and output from the fourth carrier Cp14 because the rotation speed of the third ring gear Rp13 is fixed to "0" as described above. Torque is then transmitted to the output shaft 4. The rotation speed of the fourth carrier Cp14 in this case is higher than the rotation speed of the fourth carrier Cp14 in the case of the above-described fourth speed. Thus, torque obtained by reducing the rotation speed of the driving force source is transmitted to the output shaft 4, and the fifth speed having a lower speed ratio than the fourth speed is set.

The sixth speed (6th) is set by engaging the clutch C12, the brake B11 and the clutch D12 and releasing the clutch C11, the clutch C13, the brake B12, the brake B13, the brake B14 and the clutch D11. The state of the sixth speed is indicated by the straight line Lf101 and straight line Lf106 of the front transmission unit Fr and a straight line Lr106 of the rear transmission unit Rr in the collinear diagram of FIG. 6. Specifically, torque is input from the input shaft 3 to the first sun gear Sp11 of the front transmission unit Fr. Torque is input from the input shaft 3 to the second carrier Cp12 of the front transmission unit Fr via the clutch C12. In addition, torque is input from the input shaft 3 to the third sun gear Sp13 and fourth sun gear Sp14 of the rear transmission unit Rr via the clutch D12. Torque input to the first sun gear Sp11 is output from the first carrier Cp11 because the brake B11 is engaged. The first carrier Cp11 rotates in a direction opposite to the rotation direction of the input shaft 3. Torque output from the first carrier Cp11 is transmitted to the second sun gear Sp12 of the front transmission unit Fr. Thus, torque input to the second carrier Cp12 via the clutch C12 is reduced in rotation speed and output from the second ring gear Rp12 because the second sun gear Sp12 is rotating in a direction opposite to the rotation direction of the input shaft 3 as described above. Torque output from the second ring gear Rp12 is transmitted to the third ring gear Rp13 of the rear transmission unit Rr.

On the other hand, torque input to the third sun gear Sp13 and the fourth sun gear Sp14 via the clutch D12 is reduced in rotation speed and output from the fourth carrier Cp14 because the rotation speed of the third ring gear Rp13 is lower than the rotation speed of the input shaft 3 as described above. Torque is then transmitted to the output shaft 4. The rotation speed of the fourth carrier Cp14 in this case is higher than the rotation speed of the fourth carrier Cp14 in the case of the above-described fifth speed. Thus, torque obtained by reducing the rotation speed of the driving force source is transmitted to the output shaft 4, and the sixth speed having a lower speed ratio than the fifth speed is set.

The seventh speed (7rd) is set by engaging the clutch C12, the brake B12 and the clutch D12 and releasing the clutch C11, the clutch C13, the brake B11, the brake B13, the brake B14 and the clutch D11. The state of the seventh speed is indicated by a straight line Lf107 and straight line Lf108 of the front transmission unit Fr and a straight line Lr107 of the rear transmission unit Rr in the collinear diagram of FIG. 6. Specifically, torque is input from the input shaft 3 to the second carrier Cp12 of the front transmission unit Fr via the clutch C12. Torque is input from the input shaft 3 to the third sun gear Sp13 and fourth sun gear Sp14 of the rear transmission unit Rr via the clutch D12. Because the brake B12 is engaged, the rotation speed of the second sun gear Sp12 together with the first carrier Cp11 is "0". Therefore, torque input to the second carrier Cp12 via the clutch C12 is reduced in rotation speed and output from the second ring gear Rp12 because the rotation speed of the second sun gear Sp12 is fixed to "0". Torque output from the second ring gear Rp12 is transmitted to the third ring gear Rp13 of the rear transmission unit Rr.

On the other hand, torque input to the third sun gear Sp13 and the fourth sun gear Sp14 via the clutch D12 is reduced in rotation speed and output from the fourth carrier Cp14 because the rotation speed of the third ring gear Rp13 is lower than the rotation speed of the input shaft 3 as described above. Torque is then transmitted to the output shaft 4. The rotation speed of the fourth carrier Cp14 in this case is higher than the rotation speed of the fourth carrier Cp14 in the case of the above-described sixth speed. Thus, torque obtained by reducing the rotation speed of the driving force source is transmitted to the output shaft 4, and the seventh speed having a lower speed ratio than the sixth speed is set.

The eighth speed (8th) is set by engaging the clutch C11 and the clutch C12, releasing the clutch C13, the brake B11, the brake B12, the brake B13 and the brake B14, and engaging one of the clutch D11 and the clutch D12. For example, the eighth speed is allowed to be set by engaging the released clutch C11 and releasing the engaged brake B12 at the time of upshifting from the state of the above-described seventh speed. In this case, the clutch C12 and the clutch D12 each are kept in the engaged state, and the clutch C13, the brake B11, the brake B13, the brake B14 and the clutch D11 each are kept in the released state. Alternatively, the eighth speed is set by engaging the released clutch C11 and releasing the engaged brake B12 at the time of downshifting from the state of the ninth speed (described later). In this case, the clutch C12 and the clutch D11 each are kept in the engaged state, and the clutch C13, the brake B11, the brake B13, the brake B14 and the clutch D12 each are kept in the released state.

In the automatic transmission 10 configured as shown in FIG. 4, the eighth speed is a so-called direct-coupling speed stage having a speed ratio of "1". The state of the eighth speed is indicated by a straight line Lf109 of the front transmission unit Fr and a straight line Lr108 of the rear transmission unit Rr in the collinear diagram of FIG. 6. For example, at the time of upshifting from any one of speed-reducing speed stages, including the first speed to the seventh speed, to the eighth speed, the eighth speed is set in a state where the clutch D11 is kept in the released state and the clutch D12 is kept in the engaged state. In this case, torque is input from the input shaft 3 to the second sun gear Sp12 of the front transmission unit Fr via the clutch C11. Torque is input from the input shaft 3 to the second carrier Cp12 of the front transmission unit Fr via the clutch C12. In addition, torque is input from the input shaft 3 to the third sun gear Sp13 and fourth sun gear Sp14 of the rear transmission unit Rr via the clutch D12. Because torque of the input shaft 3 is input to the second sun gear Sp12 and the second carrier Cp12 at the same time, all the rotating elements of the second planetary gear train P12 rotate at the same rotation speed as the input shaft 3. That is, the whole of the second planetary gear train P12 rotates integrally with the input shaft 3. Accordingly, all the rotating elements of the first planetary gear train P11 also rotate at the same rotation speed as the input shaft 3. Thus, torque input from the input shaft 3 to the front transmission unit Fr is directly output from the second ring gear Rp12. Torque output from the second ring gear Rp12 is transmitted to the third ring gear Rp13 of the rear transmission unit Rr.

For example, at the time of shifting from the ninth speed (described later) to the eighth speed, the eighth speed is set in a state where the clutch D11 is engaged and the clutch D12 is released. In this case, torque is input from the input shaft 3 to the second sun gear Sp12 of the front transmission unit Fr via the clutch C11. Torque is input from the input shaft 3 to the second carrier Cp12 of the front transmission unit Fr via the clutch C12. In addition, torque is input from the input shaft 3 to the third carrier Cp13 and fourth ring gear Rp14 of the rear transmission unit Rr via the clutch D11.

On the other hand, in the rear transmission unit Rr, when the clutch D11 is engaged, torque from the input shaft 3 is also input to the third carrier Cp13 and the fourth ring gear Rp14. Alternatively, when the clutch D12 is engaged, torque from the input shaft 3 is also input to the third sun gear Sp13 and the fourth sun gear Sp14. In any case, torque of the input shaft 3 is input to any two of the rotating elements of the third planetary gear train P13 at the same time. Therefore, all the rotating elements of the third planetary gear train P13 rotate at the same rotation speed as the input shaft 3. Accordingly, all the rotating elements of the fourth planetary gear train P14 rotate at the same rotation speed as the input shaft 3. That is, the whole of the rear transmission unit Rr also rotates integrally with the input shaft 3. Thus, torque of the input shaft 3 is directly output from the fourth carrier Cp14. Torque is then transmitted to the output shaft 4. The rotation speed of the fourth carrier Cp14 in this case is the same as the rotation speed of the input shaft 3, and is higher than the rotation speed of the fourth carrier Cp14 in the case of the above-described seventh speed. Thus, torque in the same rotation speed as the rotation speed of the driving force source is transmitted to the output shaft 4, and the eighth speed having a lower speed ratio than the seventh speed and having a speed ratio of "1" is set.

The ninth speed (9rd) is set by engaging the clutch C12, the brake B12 and the clutch D11 and releasing the clutch C11, the clutch C13, the brake B11, the brake B13, the brake B14 and the clutch D12. The state of the ninth speed is indicated by the straight line Lf107 and straight line Lf108 of the front transmission unit Fr and a straight line Lr109 of the rear transmission unit Rr in the collinear diagram of FIG. 6. Specifically, torque is input from the input shaft 3 to the second carrier Cp12 of the front transmission unit Fr via the clutch C12. In addition, torque is input from the input shaft 3 to the third carrier Cp13 and fourth ring gear Rp14 of the rear transmission unit Rr via the clutch D11. Because the brake B12 is engaged, the rotation speed of the second sun gear Sp12 together with the first carrier Cp11 is "0". Thus, torque input to the second carrier Cp12 via the clutch C12 is reduced in rotation speed and output from the second ring gear Rp12 because the rotation speed of the second sun gear Sp12 is fixed to "0". Torque output from the second ring gear Rp12 is transmitted to the third ring gear Rp13 of the rear transmission unit Rr.

On the other hand, torque input to the third carrier Cp13 and the fourth ring gear Rp14 via the clutch D11 is increased in rotation speed and output from the fourth carrier Cp14 because the rotation speed of the third ring gear Rp13 is lower than the rotation speed of the input shaft 3 as described above. Torque is then transmitted to the output shaft 4. The rotation speed of the fourth carrier Cp14 in this case is higher than the rotation speed of the fourth carrier Cp14 in the case of the above-described eighth speed. Thus, torque obtained by increasing the rotation speed of the driving force source is transmitted to the output shaft 4, and the ninth speed having a lower speed ratio than the eighth speed is set.

The tenth speed (10th) is set by engaging the clutch C12, the brake B11 and the clutch D11 and releasing the clutch C11, the clutch C13, the brake B12, the brake B13, the brake B14 and the clutch D12. The state of the tenth speed is indicated by the straight line Lf101 and straight line Lf106 of the front transmission unit Fr and a straight line Lr110 of the rear transmission unit Rr in the collinear diagram of FIG. 6. Specifically, torque is input from the input shaft 3 to the first sun gear Sp11 of the front transmission unit Fr. Torque is input from the input shaft 3 to the second carrier Cp12 of the front transmission unit Fr via the clutch C12. In addition, torque is input from the input shaft 3 to the third carrier Cp13 and fourth ring gear Rp14 of the rear transmission unit Rr via the clutch D11. Torque input to the first sun gear Sp11 is output from the first carrier Cp11 because the brake B11 is engaged. The first carrier Cp11 rotates in a direction opposite to the rotation direction of the input shaft 3. Torque output from the first carrier Cp11 is transmitted to the second sun gear Sp12 of the front transmission unit Fr. Thus, torque input to the second carrier Cp12 via the clutch C12 is reduced in rotation speed and output from the second ring gear Rp12 because the second sun gear Sp12 is rotating in a direction opposite to the rotation direction of the input shaft 3 as described above. Torque output from the second ring gear Rp12 is transmitted to the third ring gear Rp13 of the rear transmission unit Rr.

On the other hand, torque input to the third carrier Cp13 and the fourth ring gear Rp14 via the clutch D11 is output from the fourth carrier Cp14 increased in rotation speed because the rotation speed of the third ring gear Rp13 is lower than the rotation speed of the input shaft 3 as described above. Torque is then transmitted to the output shaft 4. The rotation speed of the fourth carrier Cp14 in this case is higher than the rotation speed of the fourth carrier Cp14 in the case of the above-described ninth speed. Thus, torque obtained by increasing the rotation speed of the driving force source is transmitted to the output shaft 4, and the tenth speed having a lower speed ratio than the ninth speed is set.

The eleventh speed (11th) is set by engaging the brake B12, the brake B13 and the clutch D11 and releasing the clutch C11, the clutch C12, the clutch C13, the brake B11, the brake B14 and the clutch D12. The state of the eleventh speed is indicated by the straight line Lf105 of the front transmission unit Fr and a straight line Lr111 of the rear transmission unit Rr in the collinear diagram of FIG. 6. Specifically, because both the brake B12 and the brake B13 are engaged, all the rotation speeds of the rotating elements of the second planetary gear train P12 are "0". Accordingly, the rotation speed of the third ring gear Rp13 of the rear transmission unit Rr coupled to the second ring gear Rp12 of the second planetary gear train P12 is also "0".

On the other hand, torque is input from the input shaft 3 to the third carrier Cp13 and fourth ring gear Rp14 of the rear transmission unit Rr via the clutch D11. Torque input to the third carrier Cp13 and the fourth ring gear Rp14 is increased in rotation speed and output from the fourth carrier Cp14 because the rotation speed of the third ring gear Rp13 is fixed to "0" as described above. Torque is then transmitted to the output shaft 4. The rotation speed of the fourth carrier Cp14 in this case is higher than the rotation speed of the fourth carrier Cp14 in the case of the above-described tenth speed. Thus, torque obtained by increasing the rotation speed of the driving force source is transmitted to the output shaft 4, and the eleventh speed having a lower speed ratio than the tenth speed is set.

The twelfth speed (12th) is set by engaging the brake B11, the brake B13 and the clutch D11 and releasing the clutch C11, the clutch C12, the clutch C13, the brake B12, the brake B14 and the clutch D12. The state of the twelfth speed is indicated by the straight line Lf101 and straight line Lf102 of the front transmission unit Fr and a straight line Lr112 of the rear transmission unit Rr in the collinear diagram of FIG. 6. Specifically, torque is input from the input shaft 3 to the first sun gear Sp11 of the front transmission unit Fr. Torque is input from the input shaft 3 to the third carrier Cp13 and fourth ring gear Rp14 of the rear transmission unit Rr via the clutch D11. Torque input to the first sun gear Sp11 is output from the first carrier Cp11 because the brake B11 is engaged. The first carrier Cp11 rotates in a direction opposite to the rotation direction of the input shaft 3. Torque output from the first carrier Cp11 is transmitted to the second sun gear Sp12 of the front transmission unit Fr. Torque transmitted to the second sun gear Sp12 is reduced in rotation speed as compared to the rotation speed of the second sun gear Sp12 and output from the second ring gear Rp12 because the brake B13 is engaged. The rotation direction of the second ring gear Rp12 in this case is still the direction opposite to the rotation direction of the input shaft 3. Torque output from the second ring gear Rp12 is transmitted to the third ring gear Rp13 of the rear transmission unit Rr.

On the other hand, torque input to the third carrier Cp13 and the fourth ring gear Rp14 via the clutch D11 is output from the fourth carrier Cp14 increased in rotation speed because torque rotating in the direction opposite to the rotation direction of the input shaft 3 is input to the third ring gear Rp13 as described above. Torque is then transmitted to the output shaft 4. The rotation speed of the fourth carrier Cp14 in this case is higher than the rotation speed of the fourth carrier Cp14 in the case of the above-described eleventh speed. Thus, torque obtained by significantly increasing the rotation speed of the driving force source is transmitted to the output shaft 4. That is, the twelfth speed having the minimum speed ratio is set.

In the automatic transmission 10 configured as shown in FIG. 4, the engagement states of the clutch D11 and clutch D12 are interchanged between speed-reducing speed stages, including the second speed to the seventh speed other than the first speed, and speed-increasing speed stages, including the ninth speed to the twelfth speed. That is, in the speed-reducing speed stages including the second speed to the seventh speed, it is indispensable that the clutch D11 is released and the clutch D12 is engaged. In contrast, in the speed-increasing speed stages including the ninth speed to the twelfth speed, it is indispensable that the clutch D11 is engaged and the clutch D12 is released. As well as the above-described clutch D1 and clutch D2, the clutch D11 and the clutch D12 are dog clutches. Therefore, when an operation to engage or release those clutch D11 and clutch D12 is carried out, it is required to synchronize the rotation speeds of the rotating members that are engaged with each other by the clutch D11 and the clutch D12. Alternatively, the clutch D11 and the clutch D12 are required to be placed in a no-load state. In contrast, the automatic transmission 10 according to the invention is configured such that, when the eighth speed is set, the rotation speeds of the rotating members that are engaged with each other by the clutch D11 and the clutch D12 are synchronized or the clutch D11 and the clutch D12 each are placed in a no-load state.

As described above, the automatic transmission 10 is configured such that the eighth speed is a direct-coupling speed stage having a speed ratio of "1". Therefore, in a state where the eighth speed is set, all the first planetary gear train P11, the second planetary gear train P12, the third planetary gear train P13 and the fourth planetary gear train P14 rotate integrally with the input shaft 3. Thus, in the state where the eighth speed is set, the third carrier Cp13 and the fourth ring gear Rp14 that are selectively coupled to the input shaft 3 by the clutch D11 each also rotate at the same rotation speed as the input shaft 3. Similarly, the third sun gear Sp13 and the fourth sun gear Sp14 that are selectively coupled to the input shaft 3 by the clutch D12 each also rotate at the same rotation speed as the input shaft 3.

In this way, in the automatic transmission 10 according to the invention, the eighth speed is set by keeping each of the clutch D11 and the clutch D12, which are dog clutches, in the engaged state or the released state and changing the engaged or released state of each of other engagement mechanisms (specifically the clutch C11 and the brake B11) other than those dog clutches D11, D12. The automatic transmission 10 is configured such that the rotation speeds of the rotating members that are engaged by the clutch D11 and the rotation speeds of the rotating members that are engaged by the clutch D12 all coincide with one another in the eighth speed. In other words, in the automatic transmission 10 according to the invention, the clutch D11 and the clutch D12 that are dog clutches are arranged so as to be indicated on a line (that is, the straight line Lin that indicates the rotation speed of the input shaft 3) at which the rotation speeds are the same in the collinear diagram for the planetary gear trains P11, P12, P13, P14 as shown in FIG. 6. The eighth speed that is set by the automatic transmission 10 is a speed stage having a speed ratio of "1" as described above. The eighth speed that is set by the automatic transmission 10 is a speed stage between the speed-reducing speed stages, including the second speed to the seventh speed and having higher speed ratios, and the speed-increasing speed stages, including the ninth speed to the twelfth speed and having lower speed ratios.

Thus, in the automatic transmission 10 according to the invention, when the eighth speed is set, all the rotation speeds of the rotating members that are coupled by the clutch D11 and the clutch D12 coincide with one another. Therefore, between the clutch D11 and the clutch D12, for example, in the released clutch D11 (or clutch D12), the rotation speeds of the two rotating members that are engaged thereafter are synchronized with each other. In the engaged clutch D12 (or clutch D11), no load is applied between the two rotating members that are released thereafter by engaging the other released clutch D11 (or clutch D12) to once set both the clutch D11 and the clutch D12 in the engaged state. Thus, by setting the eighth speed, each of the clutch D11 and the clutch D12 is operable to be engaged or released. In this state, by engaging the clutch D11 and releasing the clutch D12, it is possible to set any one of the speed-increasing speed stages including the ninth speed to the twelfth speed. Alternatively, by releasing the clutch D11 and engaging the clutch D12, it is possible to set any one of the speed-reducing speed stages including the second speed to the seventh speed. Therefore, with the automatic transmission 10 according to the invention, for example, without providing a special device or mechanism, such as a synchromesh mechanism, it is possible to bring the rotation speeds of the rotating members that are coupled by the clutch D11 and the clutch D12, which are dog clutches, into coincidence with one another. Alternatively, without executing special control for only the purpose of that, it is possible to bring the rotation speeds of the rotating members that are coupled by the dog clutches into coincidence with one another. Because the other engagement mechanisms other than the clutch D11 or the clutch D12 are not engaged in order to only operate the clutch D11 or the clutch D12 as described above, it is possible to suppress a decrease in the durability of those other engagement devices.

In contrast to the forward speed stages including the first speed to the twelfth speed that are set as described above, the reverse speed stage (Rev) is set by engaging the clutch C12, the brake B11 and the brake B14 and releasing the clutch C11, the clutch C13, the brake B12, the brake B13, the clutch D11 and the clutch D12. The state of the reverse speed stage is indicated by the straight line Lf101 and straight line Lf106 of the front transmission unit Fr and a straight line Lr113 of the rear transmission unit Rr in the collinear diagram of FIG. 6. Specifically, torque is input from the input shaft 3 to the first sun gear Sp11 of the front transmission unit Fr. Torque is input from the input shaft 3 to the second carrier Cp12 of the front transmission unit Fr via the clutch C12. Torque input to the first sun gear Sp11 is output from the first carrier Cp11 because the brake B11 is engaged. The first carrier Cp11 rotates in a direction opposite to the rotation direction of the input shaft 3. Torque output from the first carrier Cp11 is transmitted to the second sun gear Sp12 of the front transmission unit Fr. Thus, torque input to the second carrier Cp12 via the clutch C12 is reduced in rotation speed and output from the second ring gear Rp12 because the second sun gear Sp12 is rotating in a direction opposite to the rotation direction of the input shaft 3 as described above. Torque output from the second ring gear Rp12 is transmitted to the third ring gear Rp13 of the rear transmission unit Rr.

Torque transmitted to the third ring gear Rp13 of the rear transmission unit Rr is output from the fourth carrier Cp14 because the brake B14 is engaged. The fourth carrier Cp14 rotates in a direction opposite to the rotation direction of the third ring gear Rp13. That is, torque is output from the fourth carrier Cp14 that rotates in a direction opposite to the rotation direction of the input shaft 3. Torque is then transmitted to the output shaft 4. The rotation speed of the fourth carrier Cp14 in this case is lower than the rotation speed of the input shaft 3. Thus, torque obtained by reducing the rotation speed of the driving force source is transmitted to the output shaft 4. The torque rotates in a direction opposite to the rotation direction of the input shaft 3. That is, the reverse speed stage is set.

The above-described reverse speed stage is set after the automatic transmission 10 is once changed from a state where any one of the forward speed stages is set to a neutral state. Alternatively, the reverse speed stage is set from the state where the neutral state is set in the automatic transmission 10. The neutral state of the automatic transmission 10 is set by releasing all the clutches C11, C12, C13, D11, D12 and the brakes B11, B12, B13, B14. Thus, when the reverse speed stage is set, the clutch D11 and the clutch D12 are once placed in a no-load state. Therefore, in order to set the reverse speed stage, it is allowed to release the clutch D11 or the clutch D12, which is a dog clutch.

FIG. 7 to FIG. 12 show further other examples of the gear train of the automatic transmission to which the invention is applied. Specifically, FIG. 1 and FIG. 4 show other configuration examples of the rear transmission unit Rr in the gear train. The rear transmission unit Rr of the automatic transmission 1 shown in FIG. 1 includes the pair of third planetary gear train P3 and fourth planetary gear train P4 that are single-pinion-type planetary gear trains. The rear transmission unit Rr of the automatic transmission 10 shown in FIG. 4 includes the pair of third planetary gear train P13 and fourth planetary gear train P14 that are single-pinion-type planetary gear trains. The third carrier Cp3 and the fourth ring gear Rp4 are coupled to each other. Alternatively, the third carrier Cp13 and the fourth ring gear Rp14 are coupled to each other. The rear transmission unit Rr of the automatic transmission 1 is configured such that the input shaft 3 is selectively coupled to the third carrier Cp3 and the fourth ring gear Rp4 by the clutch D1. The rear transmission unit Rr of the automatic transmission 1 is configured such that the input shaft 3 is selectively coupled to the third sun gear Sp3 and the fourth sun gear Sp4 by the clutch D2. Alternatively, the rear transmission unit Rr of the automatic transmission 10 is configured such that the input shaft 3 is selectively coupled to the third carrier Cp13 and the fourth ring gear Rp14 by the clutch D11. The rear transmission unit Rr of the automatic transmission 10 is configured such that the input shaft 3 is selectively coupled to the third sun gear Sp13 and the fourth sun gear Sp14 by the clutch D12.

In contrast, the rear transmission unit Rr of the automatic transmission according to the invention may employ double-pinion-type planetary gear trains instead of the single-pinion-type planetary gear trains. The coupling relationship between the two planetary gear trains that constitute the rear transmission unit Rr may be changed. The rotating elements that are selectively coupled to the input shaft 3 may be changed by the clutch D1 and the clutch D2 or may be changed by the clutch D11 and the clutch D12.

Figure 7:
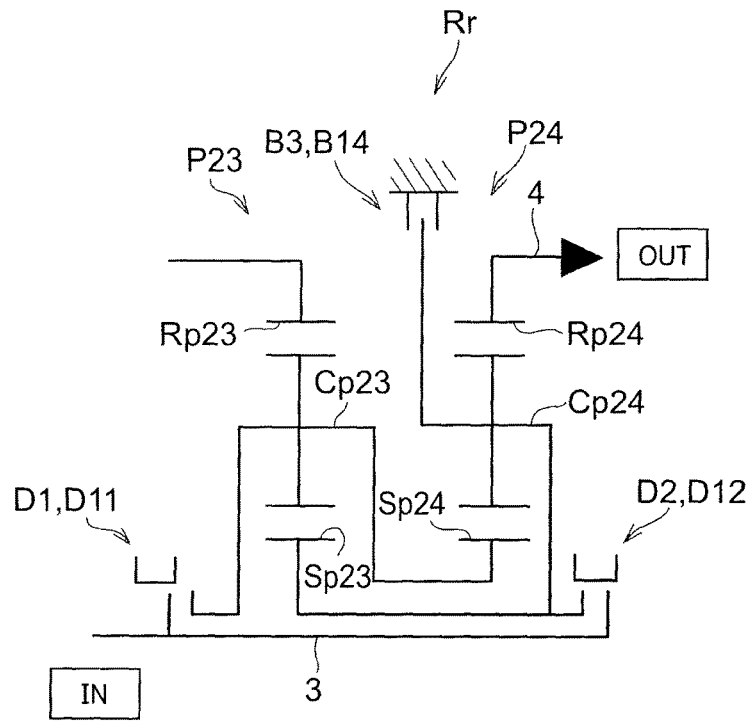
FIG. 7 is a skeletal view for illustrating a variation of a combination of planetary gear trains and engagement mechanisms that are used in the vehicle automatic transmission according to the invention.

For example, the rear transmission unit Rr shown in FIG. 7 includes a single-pinion-type third planetary gear train P23 and a single-pinion-type fourth planetary gear train P24. A third carrier Cp23 of the third planetary gear train P23 is coupled to a fourth sun gear Sp24 of the fourth planetary gear train P24. A third sun gear Sp23 of the third planetary gear train P23 is coupled to a fourth carrier Cp24 of the fourth planetary gear train P24. The brake B3 or the brake B14 is provided in the third sun gear Sp23 and the fourth carrier Cp24. The brake B3 or the brake B14 selectively stops rotation of those third sun gear Sp23 and fourth carrier Cp24. A third ring gear Rp23 of the third planetary gear train P23 is coupled to the second carrier Cp2 of the front transmission unit Fr shown in FIG. 1 or the second ring gear Rp12 of the front transmission unit Fr shown in FIG. 4. A fourth ring gear Rp24 of the fourth planetary gear train P24 is coupled to the output shaft 4. The clutch D1 or the clutch D11 is provided between the input shaft 3 and the third planetary gear train P23. The clutch D1 or the clutch D11 selectively couples the input shaft 3 to the third carrier Cp23 and the fourth sun gear Sp24. The clutch D2 or the clutch D12 is provided between the input shaft 3 and the fourth planetary gear train P24. The clutch D2 or the clutch D12 selectively couples the input shaft 3 to the third sun gear Sp23 and the fourth carrier Cp24. In this case as well, the clutches D1, D2 or the clutches D11, D12 each are arranged on the input shaft 3 or on a rotary shaft connected to the input shaft 3.

Figure 8:
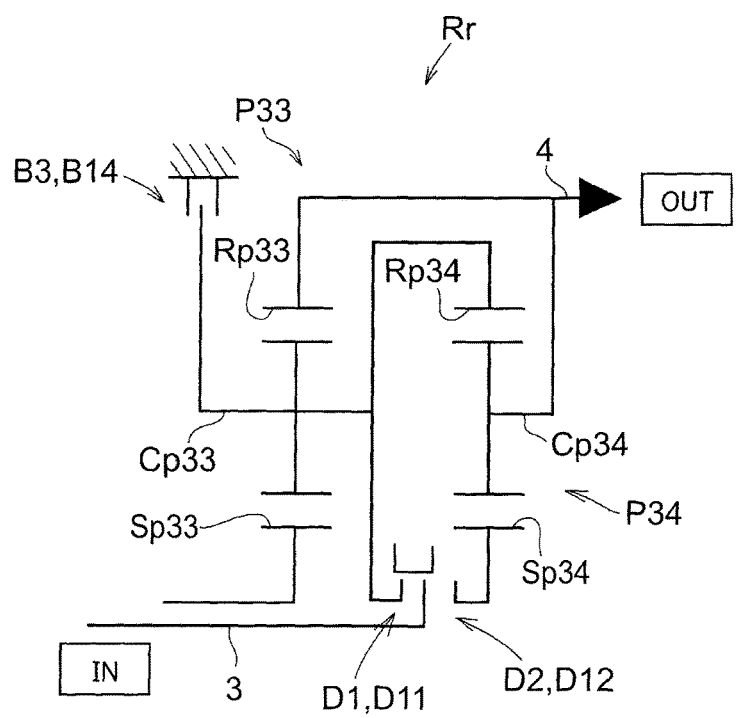
FIG. 8 is a skeletal view for illustrating a variation of a combination of planetary gear trains and engagement mechanisms that are used in the vehicle automatic transmission according to the invention.

The rear transmission unit Rr shown in FIG. 8 includes a single-pinion-type third planetary gear train P33 and a single-pinion-type fourth planetary gear train P34. A third carrier Cp33 of the third planetary gear train P33 is coupled to a fourth ring gear Rp34 of the fourth planetary gear train P34. A third ring gear Rp33 of the third planetary gear train P33 is coupled to a fourth carrier Cp34 of the fourth planetary gear train P34. The brake B3 or the brake B14 is provided between the third carrier Cp33 and the fourth ring gear Rp34. The brake B3 or the brake B14 selectively stops rotation of those third carrier Cp33 and fourth ring gear Rp34. A third sun gear Sp33 of the third planetary gear train P33 is coupled to the second carrier Cp2 of the front transmission unit Fr shown in FIG. 1 or the second ring gear Rp14 of the front transmission unit Fr shown in FIG. 4. A fourth carrier Cp34 of the fourth planetary gear train P34 and a third ring gear Rp33 of the third planetary gear train P33 are coupled to the output shaft 4. The clutch D1 or the clutch D11 is provided between the input shaft 3 and the third planetary gear train P33. The clutch D1 or the clutch D11 selectively couples the input shaft 3 to the third carrier Cp33 and the fourth ring gear Rp34. The clutch D2 or the clutch D12 is provided between the input shaft 3 and the fourth planetary gear train P34. The clutch D2 or the clutch D12 selectively couples the input shaft 3 to the fourth sun gear Sp34. In this case as well, the clutches D1, D2 or the clutches D11, D12 each are arranged on the input shaft 3 or on a rotary shaft connected to the input shaft 3.

Figure 9:
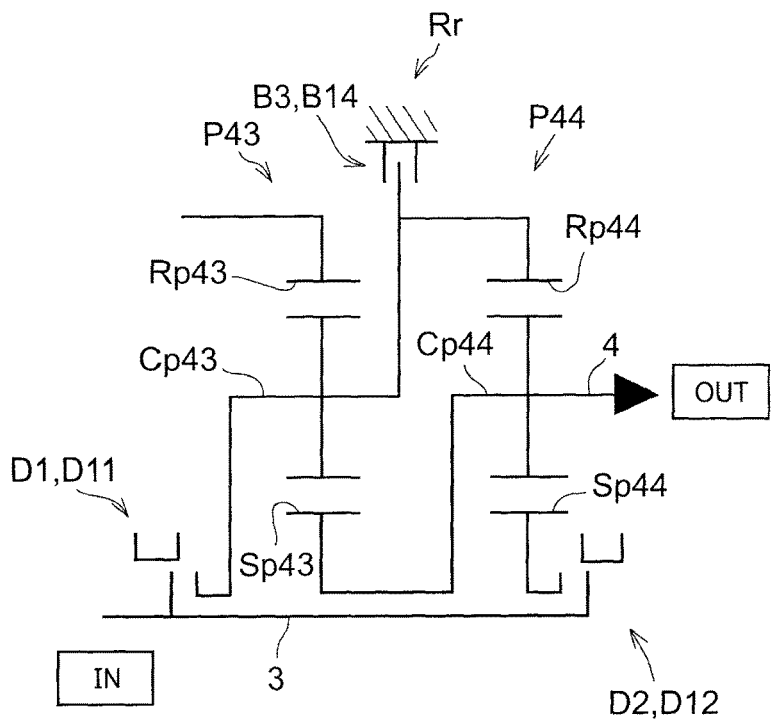
FIG. 9 is a skeletal view for illustrating a variation of a combination of planetary gear trains and engagement mechanisms that are used in the vehicle automatic transmission according to the invention.

The rear transmission unit Rr shown in FIG. 9 includes a single-pinion-type third planetary gear train P43 and a single-pinion-type fourth planetary gear train P44. A third carrier Cp43 of the third planetary gear train P43 is coupled to a fourth ring gear Rp44 of the fourth planetary gear train P44. A third sun gear Sp43 of the third planetary gear train P43 is coupled to a fourth carrier Cp44 of the fourth planetary gear train P44. The brake B3 or the brake B14 is provided between the third carrier Cp43 and the fourth ring gear Rp44. The brake B3 or the brake B14 selectively stops rotation of those third carrier Cp43 and fourth ring gear Rp44. A third ring gear Rp43 of the third planetary gear train P43 is coupled to the second carrier Cp2 of the front transmission unit Fr shown in FIG. 1 or the second ring gear Rp12 of the front transmission unit Fr shown in FIG. 4. The fourth carrier Cp44 of the fourth planetary gear train P44 is coupled to the output shaft 4. The clutch D1 or the clutch D11 is provided between the input shaft 3 and the third planetary gear train P43. The clutch D1 or the clutch D11 selectively couples the input shaft 3 to the third carrier Cp43 and the fourth ring gear Rp44. The clutch D2 or the clutch D12 is provided between the input shaft 3 and the fourth planetary gear train P44. The clutch D2 or the clutch D12 selectively couples the input shaft 3 to the fourth sun gear Sp44. In this case as well, the clutches D1, D2 or the clutches D11, D12 each are arranged on the input shaft 3 or on a rotary shaft connected to the input shaft 3.

Figure 10:
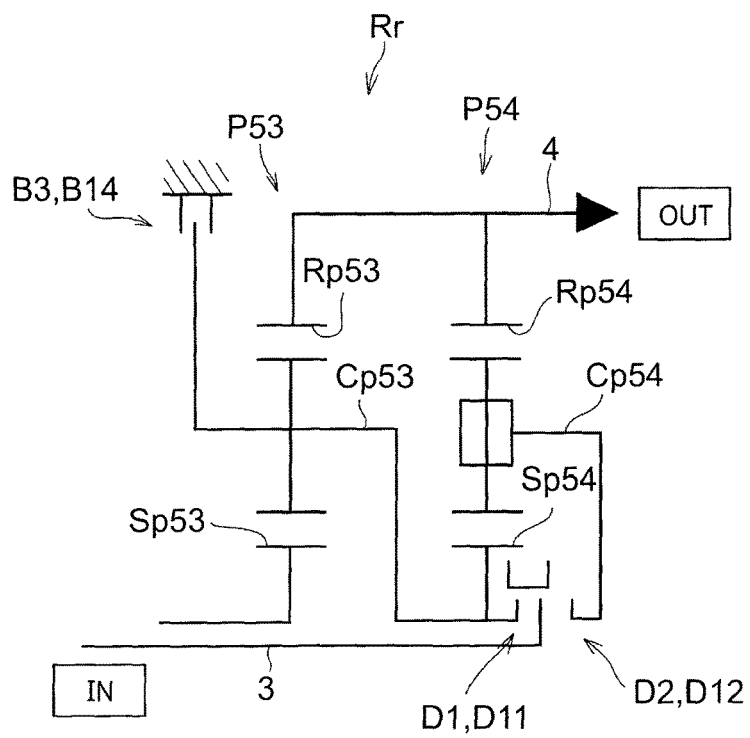
FIG. 10 is a skeletal view for illustrating a variation of a combination of planetary gear trains and engagement mechanisms that are used in the vehicle automatic transmission according to the invention.

The rear transmission unit Rr shown in FIG. 10 includes a single-pinion-type third planetary gear train P53 and a double-pinion-type fourth planetary gear train P54. A third carrier Cp53 of the third planetary gear train P53 is coupled to a fourth sun gear Sp54 of the fourth planetary gear train P54. A third ring gear Rp53 of the third planetary gear train P53 is coupled to a fourth ring gear Rp54 of the fourth planetary gear train P54. The brake B3 or the brake B14 is provided in the third carrier Cp53 and the fourth sun gear Sp54. The brake B3 or the brake B14 selectively stops rotation of those third carrier Cp53 and fourth sun gear Sp54. A third sun gear Sp53 of the third planetary gear train P53 is coupled to the second carrier Cp2 of the front transmission unit Fr shown in FIG. 1 or the second ring gear Rp12 of the front transmission unit Fr shown in FIG. 4. A fourth ring gear Rp54 of the fourth planetary gear train P54 is coupled to the output shaft 4. The clutch D1 or the clutch D11 is provided between the input shaft 3 and the third planetary gear train P53. The clutch D1 or the clutch D11 selectively couples the input shaft 3 to the third carrier Cp53 and the fourth sun gear Sp54. The clutch D2 or the clutch D12 is provided between the input shaft 3 and the fourth planetary gear train P54. The clutch D2 or the clutch D12 selectively couples the input shaft 3 to the fourth carrier Cp54. In this case as well, the clutches D1, D2 or the clutches D11, D12 each are arranged on the input shaft 3 or on a rotary shaft connected to the input shaft 3.

Figure 11:
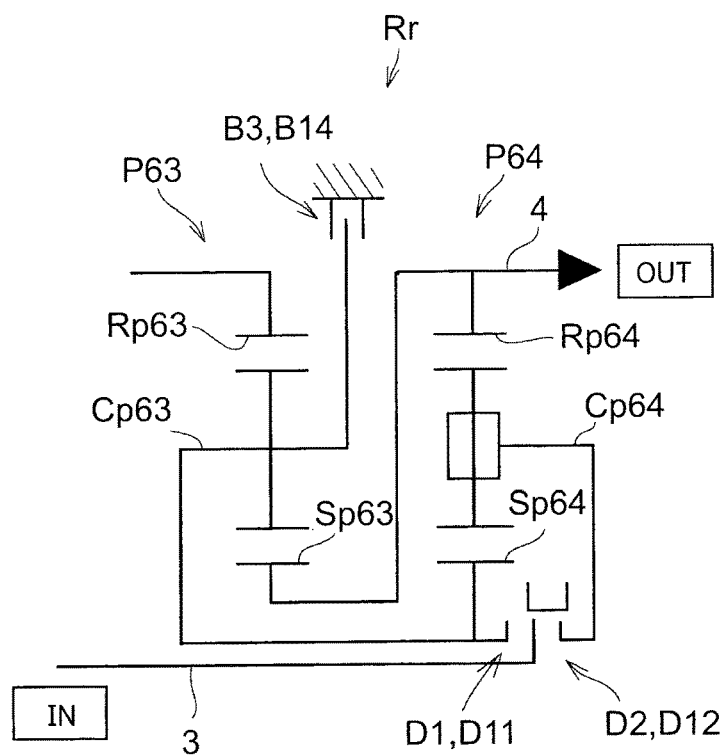
FIG. 11 is a skeletal view for illustrating a variation of a combination of planetary gear trains and engagement mechanisms that are used in the vehicle automatic transmission according to the invention.

The rear transmission unit Rr shown in FIG. 11 includes a single-pinion-type third planetary gear train P63 and a double-pinion-type fourth planetary gear train P64. A third carrier Cp63 of the third planetary gear train P63 is coupled to a fourth sun gear Sp64 of the fourth planetary gear train P64. A third sun gear Sp63 of the third planetary gear train P63 is coupled to a fourth ring gear Rp64 of the fourth planetary gear train P64. The brake B3 or the brake B14 is provided in the third carrier Cp63 and the fourth sun gear Sp64. The brake B3 or the brake B14 selectively stops rotation of those third carrier Cp63 and fourth sun gear Sp64. A third ring gear Rp63 of the third planetary gear train P63 is coupled to the second carrier Cp2 of the front transmission unit Fr shown in FIG. 1 or the second ring gear Rp12 of the front transmission unit Fr shown in FIG. 4. A fourth ring gear Rp64 of the fourth planetary gear train P64 is coupled to the output shaft 4. The clutch D1 or the clutch D11 is provided between the input shaft 3 and the third planetary gear train P63. The clutch D1 or the clutch D11 selectively couples the input shaft 3 to the third carrier Cp63 and the fourth sun gear Sp64. The clutch D2 or the clutch D12 is provided between the input shaft 3 and the fourth planetary gear train P64. The clutch D2 or the clutch D12 selectively couples the input shaft 3 to the fourth carrier Cp64. In this case as well, the clutches D1, D2 or the clutches D11, D12 each are arranged on the input shaft 3 or on a rotary shaft connected to the input shaft 3.

Figure 12:
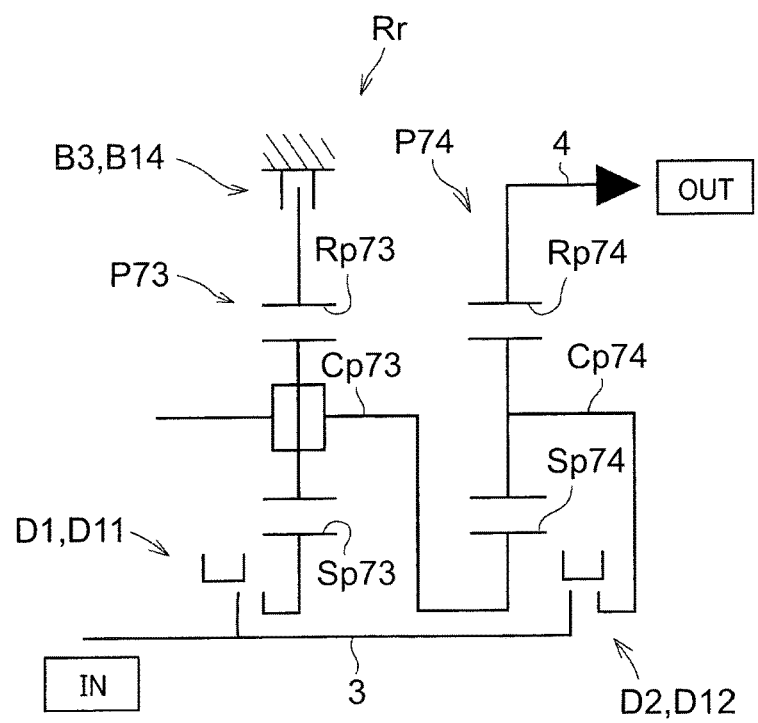
FIG. 12 is a skeletal view for illustrating a variation of a combination of planetary gear trains and engagement mechanisms that are used in the vehicle automatic transmission according to the invention.

The rear transmission unit Rr shown in FIG. 12 includes a double-pinion-type third planetary gear train P73 and a single-pinion-type fourth planetary gear train P74. A third carrier Cp73 of the third planetary gear train P73 is coupled to a fourth sun gear Sp74 of the fourth planetary gear train P74. The brake B3 or the brake B14 is provided in the third ring gear Rp73 of the third planetary gear train P73. The brake B3 or the brake B14 selectively stops rotation of the third ring gear Rp73. A third carrier Cp73 of the third planetary gear train P73 is coupled to the second carrier Cp2 of the front transmission unit Fr shown in FIG. 1 or the second ring gear Rp12 of the front transmission unit Fr shown in FIG. 4. A fourth ring gear Rp74 of the fourth planetary gear train P74 is coupled to the output shaft 4. The clutch D1 or the clutch D11 is provided between the input shaft 3 and the third planetary gear train P73. The clutch D1 or the clutch D11 selectively couples the input shaft 3 to the third sun gear Sp73. The clutch D2 or the clutch D12 is provided between the input shaft 3 and the fourth planetary gear train P74. The clutch D2 or the clutch D12 selectively couples the input shaft 3 to the fourth carrier Cp74. In this case as well, the clutches D1, D2 or the clutches D11, D12 each are arranged on the input shaft 3 or on a rotary shaft connected to the input shaft 3.

Figure 13:
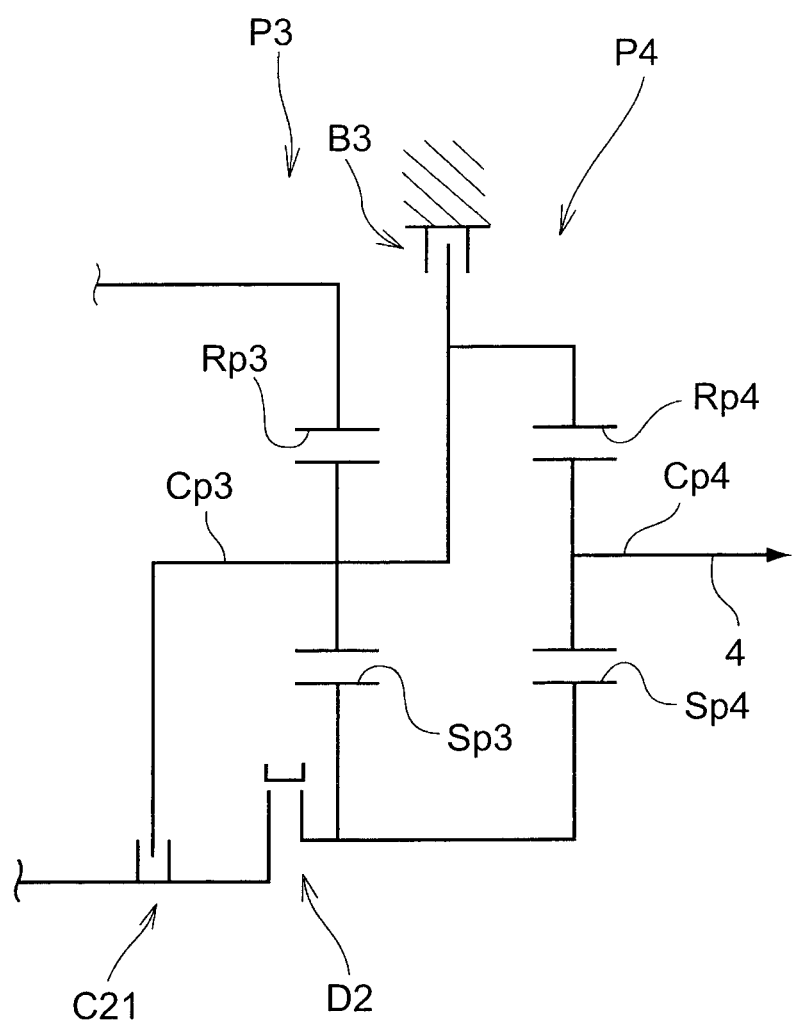
FIG. 13 is a skeletal view for illustrating another configuration example of a first engagement mechanism and a second engagement mechanism that are used in the vehicle automatic transmission according to the invention.
Figure 14:
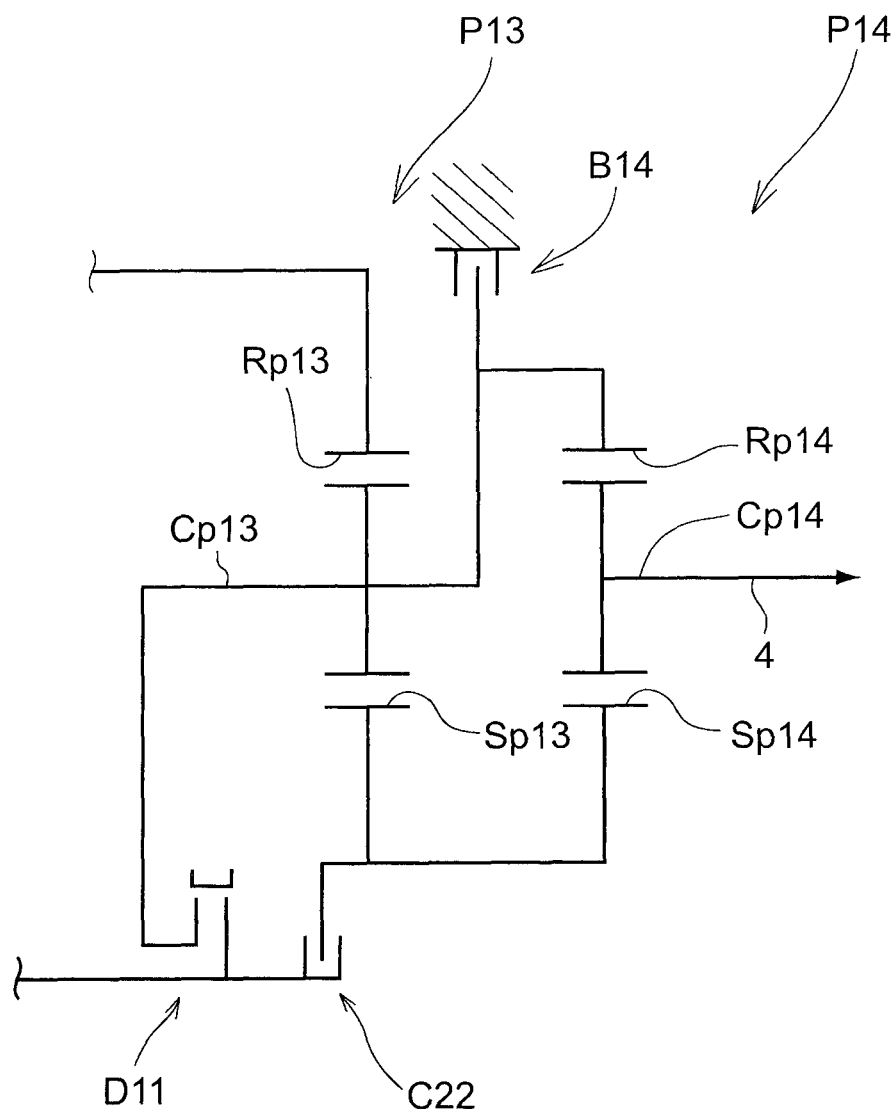
FIG. 14 is a skeletal view for illustrating another configuration example of a first engagement mechanism and a second engagement mechanism that are used in the vehicle automatic transmission according to the invention.

In above-described specific examples, the first engagement mechanism and the second engagement mechanism according to the invention each are a dog clutch. However, at least one of the first engagement mechanism or the second engagement mechanism according to the invention just needs to be a dog clutch. That is, as shown in FIG. 13, instead of the clutch D1 in the example shown in FIG. 1, a clutch C21 that is a friction clutch may be provided. Alternatively, as shown in FIG. 14, instead of the clutch D12 in the example shown in FIG. 4, a clutch C22 that is a friction clutch may be provided.

In the above-described specific examples, the first rotating member (the input shaft 3 in the specific examples), the second rotating member (the third carrier Cp3 in the example shown in FIG. 1, the third carrier Cp13 in the example shown in FIG. 4) and the third rotating member (the third sun gear Sp3 in the example shown in FIG. 1, the third sun gear Sp13 in the example shown in FIG. 4) are selectively engaged by the first engagement mechanism and the second engagement mechanism according to the invention, and the first rotating member, the second rotating member and the third rotating member are configured such that the rotation speed of the first rotating member, the rotation speed of the second rotating member and the rotation speed of the third rotating member all coincide with the rotation speed of the input shaft 3 by setting the intermediate speed stage (the seventh speed in the example shown in FIG. 1, the eighth speed in the example shown in FIG. 4) according to the invention. However, in the vehicle automatic transmission according to the invention, when the intermediate speed stage is set, not all the rotation speed of the first rotating member, the rotation speed of the second rotating member and the rotation speed of the third rotating member always need to coincide with the rotation speed of the input shaft. That is, the intermediate speed stage may not necessarily be a speed stage having a speed ratio of "1". For example, as shown in FIG. 15A to FIG. 15D, a speed-reducing speed stage having a speed ratio higher than "1" may be set in a state where the intermediate speed stage is set. FIG. 15A to FIG. 15D are collinear diagrams for illustrating the operation principle of the vehicle automatic transmission to which the invention is applied.

Specifically, in the collinear diagrams of FIG. 15A to FIG. 15D, the left-side three vertical lines represent three rotating elements of the front transmission unit Fr, and the right-side four vertical lines represent the four rotating elements of the rear transmission unit Rr. A horizontal line indicated by "0" is a base line at which the rotation speed is "0". The straight line Lin is a horizontal line that indicates the rotation speed of the input shaft. In the vehicle automatic transmission illustrated in FIG. 15A to FIG. 15D, the front transmission unit Fr includes a first element 101, a second element 102 and a third element 103. The first element 101, the second element 102 and the third element 103 differentially rotate with one another. The front transmission unit Fr includes a clutch C101, a clutch C102 and a clutch C103. The clutch C101 selectively couples the input shaft to the third element 103. The clutch C102 selectively couples the input shaft to the second element 102. The clutch C103 selectively couples a predetermined rotating member with the second element 102. The predetermined rotating member rotates at a rotation speed lower than that of the input shaft. The above-described clutches C101, C102, C103 each are a friction clutch that engages rotating members with each other by friction force. The rotating members rotate relative to each other. The first element 101 of the front transmission unit Fr is fixed so as to be non-rotatable.

The rear transmission unit Rr includes a first element 201, a second element 202, a third element 203 and a fourth element 204. The rear transmission unit Rr includes a brake B101 and a clutch D101. The brake B101 selectively stops rotation of the third element 203. The clutch D101 selectively couples the input shaft to the first element 201. The clutch D101 is a dog clutch that meshes and mechanically engages rotating members with each other. The rotating members rotate relative to each other. The brake B101 is formed of a friction brake that engages a rotating member with a fixed member by friction force. The brake B101 may be a dog brake that meshes and mechanically engages a rotating member and a fixed member with each other. The second element 202 of the rear transmission unit Rr is coupled to the third element 103 of the above-described front transmission unit Fr. The fourth element 204 of the rear transmission unit Rr is coupled to the output shaft.

In the vehicle automatic transmission shown in FIG. 15A to FIG. 15D, the first speed (1st) having the maximum speed ratio is set by engaging the clutch C101 of the front transmission unit Fr, releasing both the clutch C102 and the clutch C103 of the front transmission unit Fr, engaging the brake B101 of the rear transmission unit Rr and releasing the clutch D101 of the rear transmission unit Rr. In the first speed, because the clutch C101 is engaged, torque is input from the input shaft to the third element 103 of the front transmission unit Fr and the second element 202 of the rear transmission unit Rr. In the rear transmission unit Rr, because the brake B101 is engaged and the clutch D101 is released, torque transmitted to the second element 202 is significantly reduced in rotation speed and output from the fourth element 204.

In the state of the above-described first speed, the second speed (2nd) is set by changing the engaged or released state of each of the clutch C101 and clutch C102 of the front transmission unit Fr, that is, releasing the clutch C101 and engaging the clutch C102. In the second speed, because the clutch C101 is released and the clutch C102 is engaged, torque input to the second element 102 is increased in rotation speed and output from the third element 103. Torque output from the third element 103 is transmitted to the second element 202 of the rear transmission unit Rr. In the rear transmission unit Rr, the brake B101 is engaged, the clutch D101 is released, and torque higher in rotation speed than the input shaft is input to the second element 202, so torque transmitted to the second element 202 is reduced in rotation speed and output from the fourth element 204. The rotation speed of the fourth element 204 in this case is higher than the rotation speed of the fourth element 204 in the case where the above-described first speed is set. Thus, the second speed having a lower speed ratio than the first speed is set.

The vehicle automatic transmission shown in FIG. 15B is configured such that, in a state where the second speed is set, the rotation speed of the first element 201 that is coupled to the input shaft by the clutch D101 that is a dog clutch coincides with the rotation speed of the input shaft. That is, the vehicle automatic transmission shown in FIG. 15B is configured such that, in a state where the second speed is set, the rotation speeds of the two rotating members that are engaged by the clutch D101 are synchronized with each other or no load is applied between the two rotating members that are engaged by the clutch D101. Thus, by setting the second speed, the clutch D101 that is a dog clutch is operable to be engaged or released. In the second speed, the clutch D101 may be in the engaged state or in the released state.

In the state of the above-described second speed, the third speed (3rd) is set by releasing the clutch C102 and engaging the clutch C101 in the front transmission unit Fr, engaging the clutch D101 and releasing the brake B101. In the third speed, because the clutch C102 is released and the clutch C101 is engaged, torque input to the third element 103 is directly transmitted to the second element 202 of the rear transmission unit Rr. In the rear transmission unit Rr, because the clutch D101 is engaged and torque in the same rotation speed as the input shaft is input to the second element 202, the whole of the rear transmission unit Rr rotates integrally. Thus, torque transmitted to the second element 202 is directly output from the fourth element 204. That is, a so-called direct-coupling speed stage having a speed ratio lower than the second speed and having a speed ratio of "1" is set.

In the state of the above-described third speed, the fourth speed (4th) is set by releasing the clutch C101 of the front transmission unit Fr and engaging the clutch C103. In the fourth speed, because the clutch C103 is engaged and both the clutch C101 and the clutch C102 are released, torque from the input shaft is not input to the front transmission unit Fr, and the third element 103 rotates at a rotation speed lower than that of the input shaft. On the other hand, in the rear transmission unit Rr, because the clutch D101 is engaged, torque from the input shaft is input to the first element 201. Because the clutch D101 is engaged, the brake B101 is released and the second element 202 together with the second element 102 of the front transmission unit Fr rotates at a rotation speed lower than that of the input shaft, torque transmitted to the first element 201 is increased in rotation speed and output from the fourth element 204. That is, the rotation speed of the fourth element 204 in this case is higher than the rotation speed of the fourth element 204 in the case where the above-described third speed is set. Thus, the fourth speed having a lower speed ratio than the third speed is set.

As described above, in the vehicle automatic transmission configured as shown in FIG. 15A to FIG. 15D, by setting the second speed corresponding to the intermediate speed stage according to the invention, the rotation speeds of the two rotating members that are coupled by the clutch D101 that is a dog clutch are synchronized with each other or no load is applied between those two rotating members. That is, by controlling the operations of other engagement mechanisms (in the example shown in FIG. 15A to FIG. 15D, the clutch C101 and the clutch C102) other than the dog clutch, the clutch D101, that is, the dog clutch, is operable to be engaged or released. Thus, it is possible to easily change the engaged or released state of the dog clutch. Therefore, it is possible to appropriately set the plurality of speed stages, that is, the first speed having a higher speed ratio than the second speed, and the third speed and the fourth speed having a lower speed ratio than the second speed.

What is claimed is:

1. An automatic transmission for a vehicle, the automatic transmission characterized by comprising:

an input shaft;
an output shaft;
a front transmission unit; and
a rear transmission unit including a plurality of planetary gear trains, the rear transmission unit being configured by a friction clutch or a friction brake,
the input shaft being connected with the front transmission unit,
the front transmission unit being connected with a front side planetary gear train of the plurality of planetary gear trains,
the output shaft being connected with a rear side planetary gear train of the plurality of planetary gear trains,
a first engagement mechanism connected with a gear, different from a gear connected with the front transmission unit, of the front side planetary gear train; and
a second engagement mechanism connected with a gear, different from a gear connected with the output shaft, of the rear side planetary gear train;
a second rotating member;
a third rotating member; and
other engagement mechanisms other than the first engagement mechanism or the second engagement mechanism,
wherein an intermediate speed stage, at least one high speed stage having a lower speed ratio than the intermediate speed stage and at least one low speed stage having a higher speed ratio than the intermediate speed stage being set by selectively engaging the front transmission unit, the rear transmission unit, the first engagement mechanism and the second engagement mechanism,
the first engagement mechanism being configured to engage the input shaft with the second rotating member,
the first engagement mechanism being configured to:
be engaged when the at least one high speed stage is set;
be released when the at least one low speed stage is set;
be kept in an engaged state at the time of shifting from the at least one high speed stage to the intermediate speed stage; and
be kept in a released state at the time of shifting from the at least one low speed stage to the intermediate speed stage,
the second engagement mechanism being configured to:
be released when the at least one high speed stage is set;
be engaged when the at least one low speed stage is set;

be kept in a released state at the time of shifting from the at least one high speed stage to the intermediate speed stage; and
be kept in an engaged state at the time of shifting from the at least one low speed stage to the intermediate speed stage,
at least one of the first engagement mechanism or the second engagement mechanism being a dog clutch, the dog clutch being configured to mechanically engage the input shaft and the second rotating member or the third rotating member, and
the automatic transmission being configured such that a rotation speed of at least one of the second rotating member or the third rotating member which is coupled to the input shaft by the dog clutch coincides with a rotation speed of the input shaft when the intermediate speed stage is set.

2. The automatic transmission according to claim 1, wherein
the intermediate speed stage is a speed stage having a speed ratio of "1".

3. The automatic transmission according to claim 1, wherein
the first engagement mechanism and the second engagement mechanism are dog clutches, and
the automatic transmission is configured such that the rotation speed of the input shaft, the rotation speed of the second rotating member and the rotation speed of the third rotating member coincide with one another when the intermediate speed stage is set.

4. The automatic transmission according to claim 1, further comprising: four planetary gear trains arranged between the input shaft and the output shaft,
wherein
the four planetary gear trains are arranged in order of a first planetary gear train, a second planetary gear train, a third planetary gear train and a fourth planetary gear train from a side close to the input shaft,
the first planetary gear train includes a first rotating element, a second rotating element and a third rotating element,
the second planetary gear train includes a fourth rotating element, a fifth rotating element and a sixth rotating element,
the third planetary gear train includes a seventh rotating element, an eighth rotating element and a ninth rotating element, and
the fourth planetary gear train includes a tenth rotating element, an eleventh rotating element and a twelfth rotating element,
the other engagement mechanisms include a first friction clutch, a second friction clutch, a third friction clutch, a first friction brake, a second friction brake and the third friction brake,
the first friction clutch is configured to selectively couple the first rotating element and the fourth rotating element to the input shaft,
the second friction clutch is configured to selectively couple the second rotating element to the input shaft,
the third friction clutch is configured to selectively couple the third rotating element and the sixth rotating element to the input shaft,
the first friction brake is configured to selectively fix each of the third rotating element and the sixth rotating element in a non-rotatable state,
the second friction brake is configured to selectively fix the second rotating element in a non-rotatable state, and the third friction brake is configured to selectively fix at least one of the rotating elements of the third planetary gear train or the rotating elements of the fourth planetary gear train in a non-rotatable state, the second rotating member is any one of the seventh rotating element, the eighth rotating element and the ninth rotating element, the third rotating member is any one of the tenth rotating element, the eleventh rotating element and the twelfth rotating element, the first engagement mechanism and the second engagement mechanism are dog clutches, and the automatic transmission is configured to set twelve forward speed stages and one reverse speed stage.

5. The automatic transmission according to claim 1, further comprising: four planetary gear trains arranged between the input shaft and the output shaft, wherein the four planetary gear trains are arranged in order of a first planetary gear train, a second planetary gear train, a third planetary gear train and a fourth planetary gear train from a side close to the input shaft, the first planetary gear train includes a first rotating element, a second rotating element and a third rotating element, the second planetary gear train includes a fourth rotating element, a fifth rotating element and a sixth rotating element, the third planetary gear train includes a seventh rotating element, an eighth rotating element and a ninth rotating element, and the fourth planetary gear train includes a tenth rotating element, an eleventh rotating element and a twelfth rotating element, the other engagement mechanisms include a first friction clutch, a second friction clutch, a third friction clutch, a first friction brake, a second friction brake, and a third friction brake, the first friction clutch is configured to selectively couple the fourth rotating element to the input shaft, the second friction clutch is configured to selectively couple the sixth rotating element to the input shaft, the third friction clutch is configured to selectively couple the third rotating element to any two of the rotating elements of the second planetary gear train, the first friction brake is configured to selectively fix the second rotating element in a non-rotatable state, the second friction brake is configured to selectively fix the third rotating element in a non-rotatable state, the third friction brake is configured to selectively fix the sixth rotating element in a non-rotatable state, and the second rotating member is any one of the seventh rotating element, the eighth rotating element and the ninth rotating element, the third rotating member is any one of the tenth rotating element, the eleventh rotating element and the twelfth rotating element, the first engagement mechanism and the second engagement mechanism are dog clutches, and the automatic transmission is configured to set twelve forward speed stages and one reverse speed stage.

6. The automatic transmission according to claim 1, wherein the front transmission unit is configured such that, when at least any two of the other engagement mechanisms are engaged, rotating elements that constitute the front transmission unit integrally rotate at the same rotation speed as the input shaft, and the rear transmission unit includes a first element, a second element, a third element and a fourth element that differentially rotate with one another by coupling predetermined rotating elements to each other in the plurality of planetary gear trains, the second rotating member is the first element, the first engagement mechanism is provided between the first element and the input shaft, the third rotating member is the second element, the second engagement mechanism is provided between the second element and the input shaft, the third element is coupled to any one of the rotating elements that constitute the front transmission unit, and the fourth element is coupled to the output shaft.

* * * * *